(12) United States Patent
Singh

(10) Patent No.: US 9,963,132 B2
(45) Date of Patent: May 8, 2018

(54) TIRE SENSOR-BASED VEHICLE CONTROL SYSTEM OPTIMIZATION AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 475 days.

(21) Appl. No.: 14/537,177

(22) Filed: Nov. 10, 2014

(65) Prior Publication Data

US 2016/0129894 A1    May 12, 2016

(51) Int. Cl.
| | | |
|---|---|---|
| *B60T 8/176* | (2006.01) | |
| *B60C 23/04* | (2006.01) | |
| *B60C 23/06* | (2006.01) | |
| *B60C 19/00* | (2006.01) | |
| *B60T 8/1761* | (2006.01) | |

(52) U.S. Cl.
CPC .............. *B60T 8/176* (2013.01); *B60C 19/00* (2013.01); *B60C 23/04* (2013.01); *B60C 23/0408* (2013.01); *B60C 23/06* (2013.01); *B60T 8/17613* (2013.01); *B60C 2019/004* (2013.01)

(58) Field of Classification Search
None
See application file for complete search history.

(56) References Cited

U.S. PATENT DOCUMENTS

| | | | | |
|---|---|---|---|---|
| 3,525,553 | A * | 8/1970 | Carp | B60T 8/17633 303/177 |
| 3,640,588 | A * | 2/1972 | Carp | B60T 8/17633 188/181 R |
| 6,241,324 | B1 * | 6/2001 | Miyazaki | B60T 8/172 303/148 |
| 6,327,904 | B1 | 12/2001 | Oldenettel | |
| 7,546,764 | B2 | 6/2009 | Morinaga | |
| 7,552,628 | B2 | 6/2009 | Mancosu | |
| 7,725,235 | B2 * | 5/2010 | Fandard | B60C 23/20 701/71 |
| 2005/0072223 | A1 | 4/2005 | Fennel et al. | |
| 2005/0085987 | A1 | 4/2005 | Yokota et al. | |

(Continued)

FOREIGN PATENT DOCUMENTS

| | | |
|---|---|---|
| EP | 2301769 A1 | 3/2011 |
| EP | 2172760 A4 | 8/2012 |

(Continued)

OTHER PUBLICATIONS

EPO Search report received by Applicant dated Mar. 9, 2016.

*Primary Examiner* — Shelley Chen
(74) *Attorney, Agent, or Firm* — Edward T. Kennedy

(57) ABSTRACT

A system and method of adjusting a vehicle anti-lock brake or collision mitigation system includes multiple tire-based sensors mounted to a vehicle tire to generate tire-derivative information. An adaptive tire model processes the tire-derivative information to continuously generate in real-time revisions to multiple tire-specific performance parameters affecting the performance of a vehicle control system. The vehicle control system receives and applies in real-time the tire-sensor based revisions to the tire-specific performance parameters optimize control system performance.

4 Claims, 24 Drawing Sheets

(56) References Cited

U.S. PATENT DOCUMENTS

| | | | |
|---|---|---|---|
| 2005/0150283 A1* | 7/2005 | Shick | B60C 11/24 |
| | | | 73/146 |
| 2007/0289795 A1* | 12/2007 | Fandard | B60C 23/20 |
| | | | 180/197 |
| 2008/0103659 A1 | 5/2008 | Mancosu | |
| 2008/0294352 A1* | 11/2008 | Spetler | G01M 17/02 |
| | | | 702/33 |
| 2009/0055040 A1 | 2/2009 | Nagaya | |
| 2011/0060500 A1 | 3/2011 | Irth et al. | |
| 2011/0199201 A1 | 8/2011 | Brusarosco et al. | |
| 2013/0211621 A1 | 8/2013 | Breuer et al. | |
| 2014/0012437 A1* | 1/2014 | Jones | B60T 8/1703 |
| | | | 701/15 |
| 2015/0005982 A1* | 1/2015 | Muthukumar | B60T 1/10 |
| | | | 701/1 |

FOREIGN PATENT DOCUMENTS

| | | |
|---|---|---|
| EP | 2679411 A2 | 1/2014 |
| EP | 2777956 A2 | 9/2014 |
| EP | 2777999 A1 | 9/2014 |
| KR | 20020052283 A * | 7/2002 |
| WO | WO2011054363 A1 | 5/2011 |

* cited by examiner

TIRE SENSOR-BASED VEHICLE CONTROL SYSTEM OPTIMIZATION AND METHOD

FIELD OF THE INVENTION

The invention relates generally to tire monitoring systems for collecting measured tire parameter data during vehicle operation and, more particularly, to systems utilizing such tire sensor-based data in vehicle control systems.

BACKGROUND OF THE INVENTION

Vehicle-mounted tires during operation undergo considerable variation in tire properties such as braking stiffness, peak grip, and force-slip curve shape. Such variations may affect the performance of certain vehicle control systems such anti-lock braking systems. It is accordingly a desired objective to mitigate the effect of tire characteristic variability on such control systems and avoid degradation in performance.

SUMMARY OF THE INVENTION

In one aspect of the invention, a system and method of controlling a vehicle is provided in which multiple tire-based sensors are mounted to a vehicle tire to sense certain tire-derivative information. An adaptive tire model processes the tire-derivative information to continuously generate in real-time revisions to multiple tire-specific performance parameters. A vehicle control system(s), such as an anti-lock brake system and/or a collision mitigation braking system receives and applies in real-time the revisions to the tire-specific performance parameters to optimize the performance of the vehicle control system.

In another aspect, the tire-specific performance parameters used to adjust the vehicle control system are from the group tire braking stiffness, tire optimal slip point, tire shape factor and tire peak grip. The tire-derivative information includes tire make and type, tire inflation pressure, tire temperature and tire tread wear state.

According to another aspect, adjustment of the anti-lock brake system by revisions to the tire-specific performance parameters is made as an adjustment to the acceleration and deceleration thresholds for the vehicle anti-lock brake system.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
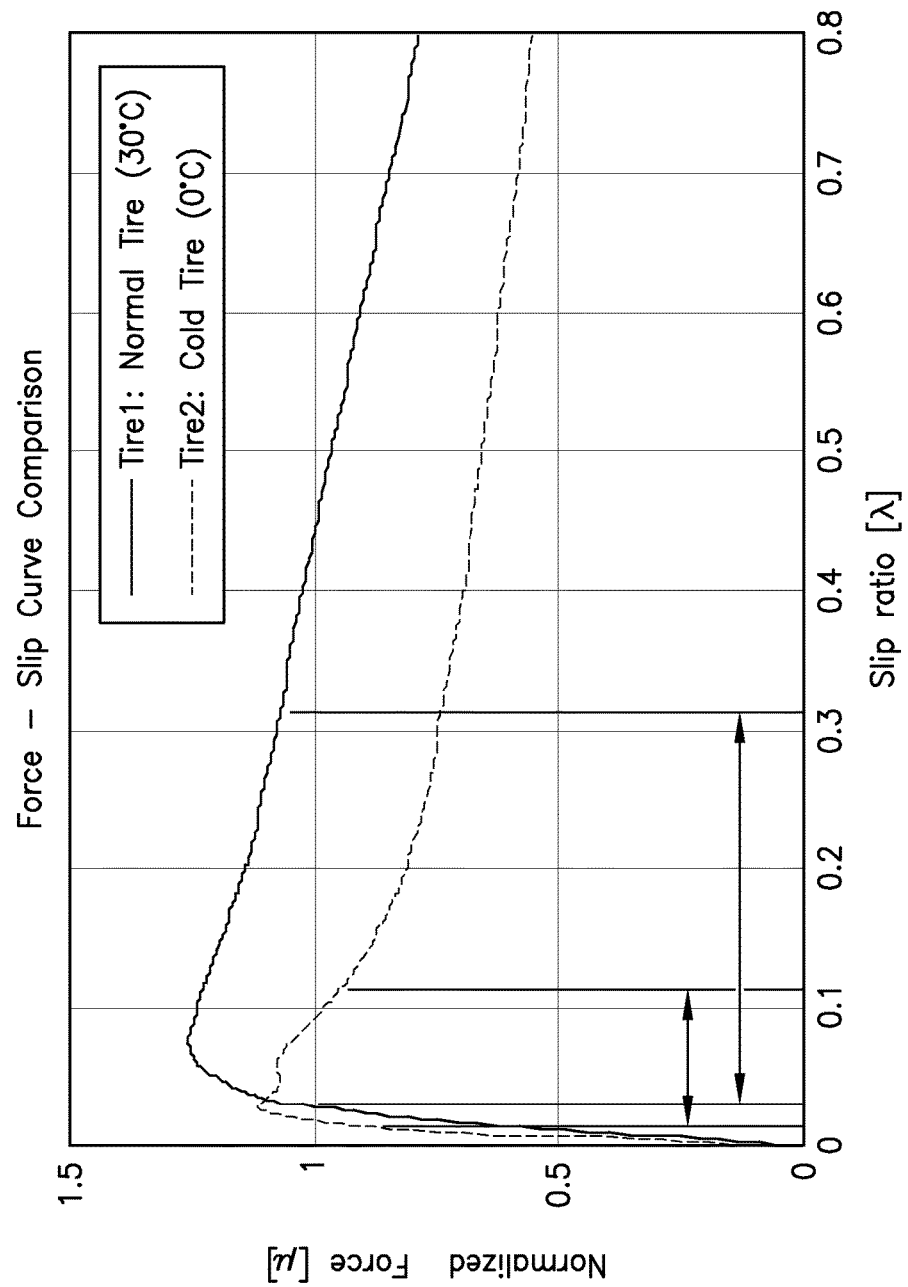
FIG. 1 is a force-slip curve comparison graph between a normal tire and a cold tire.

Referring to FIG. 1, a normalized force [μ] to slip ratio [λ] is shown comparing a "normal" tire at temperature 30° C. with a cold tire at temperature of 0° C. As used herein, "normal" refers to a tire at a normal operating temperature of 30° C. As compared to the normal tire, the cold tire has a 40 to 45 percent higher braking stiffness; that is the optimal slip-ratio change point changes by approximately 50 percent. Also noted is a 10 to 15 percent lower peak grip level and a shape factor (drop in the nonlinear region) of the force slip curve changes significantly. In general, a tire is subjected to large variations in operating conditions such as temperature, inflation pressure and changing tread depth as the tire ages. The longitudinal force response of the tire changes significantly due to each of these operating conditions. Experimental data as shown herein indicates a considerable variation in tire properties such as braking stiffness, peak grip and force-slip curve shape due to change in tire temperature, wear state and tire construction (summer/winter/all-season). Variation in tire-force curves in turn have a significant effect on the braking performance (ABS efficiency/stopping distance) of the vehicle equipped with an anti-lock braking system (ABS) with fixed thresholds. Worn and cold tires can lead to a drop in ABS efficiency during braking due to a change in the optimum slip region which the ABS does not recognize. The subject control system employs tire identification (ID) in order to identify tire construction (summer/winter/all-season) with tire-attached tire pressure monitoring system (TPMS) devices to deliver tire temperature and pressure data in order to predict this change in the tire-force curve. As used herein, "tire sensed information" thus includes tire ID (used to ascertain tire construction type) and TPMS data (pressure and temperature) applied to predict the tire-force curve. Once the tire sensed information is known, the ABS can be adapted to recover the drop in efficiency through threshold optimization and thereby improve braking distance.

Figure 2:
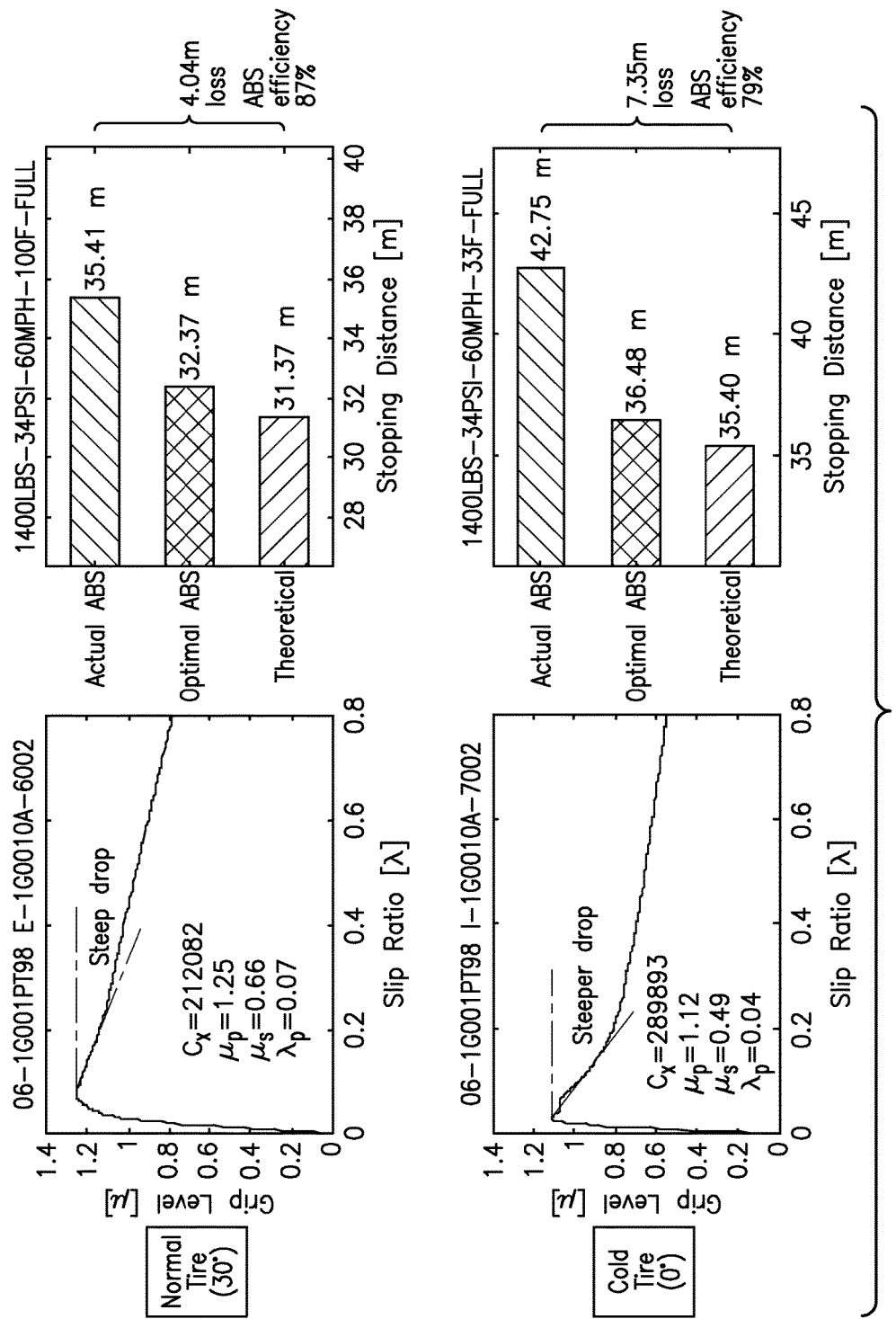
FIG. 2 are graphs showing the results of a sensitivity study on achievable braking performance between a normal tire and a cold tire.

The graphs of FIG. 2 show the results of a sensitivity study on achievable braking performance. Both a normal (temperature) tire and a cold tire were tested at 1400 pounds loading, 34 psi inflation pressure and at a speed of 60 mph. The tire tested was a Goodyear 06-1G001PT98 E-1G0010A-6002 tire. The tire slip ratio curves for the normal tire showed a 4.04 m loss between actual ABS stopping distance and theoretical stopping distance, resulting in an ABS efficiency of 87 percent. For the cold tire (steeper drop in the curve), the loss was 7.35 m, resulting in an ABS efficiency of 79 percent. The simulation results thus show that the variation in the tire-force curves have a significant effect on the braking performance of the vehicle equipped with an ABS with fixed thresholds.

Figure 3:
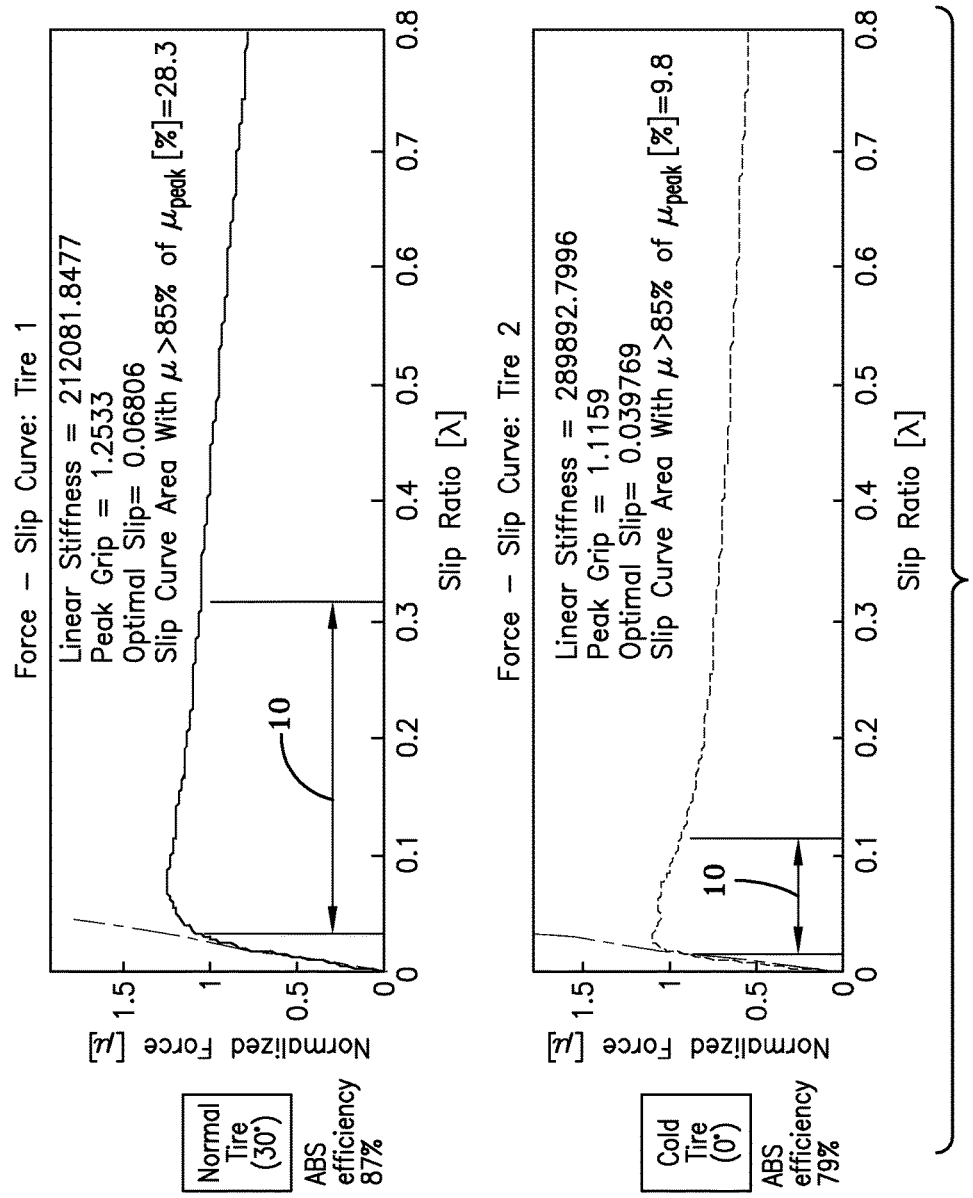
FIG. 3 are sensitivity study graphs showing tire construction dependency on achieving braking performance.

In FIG. 3, force-slip curves of a normal tire and a cold tire are shown. The two tires differ in linear stiffness, peak grip, optimal slip and slip curve area with μ>85 percent of $\mu_{peak}$. The change noted in the optimal slip operation point indicates a deterioration in the performance of fixed thresholding rule based ABS algorithms. From this, it may be concluded that the reason for cold tire effect on braking is that a cold tire has a much higher braking stiffness and lower damping resulting in a faster response time, higher overshoot. A change in the shape factor of the force-slip curve and the limited flat area denoted at numeral 10, causes a loss in the ABS efficiency.

Figure 4:
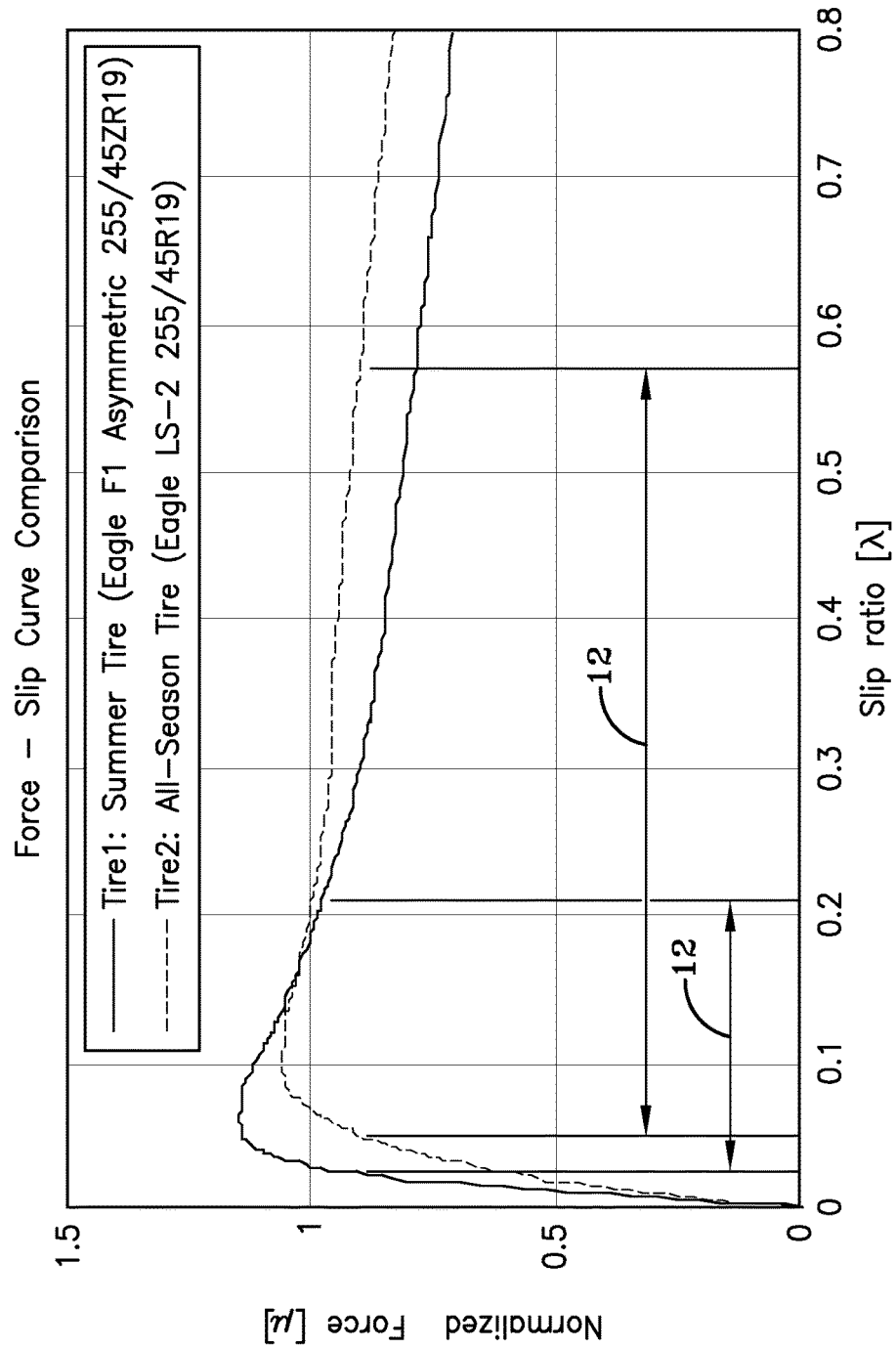
FIG. 4 is another sensitivity study graph showing construction dependency on achieving braking performance.

FIG. 4 is another force-slip curve comparison between two tires. Tire 1 being a Goodyear Summer Eagle F1 Asymmetric tire and Tire 2 a Goodyear All-Season Eagle tire. The dependency of ABS braking to tire construction will be appreciated from a comparison of the graphs of the two types of tires. The flat regions 12 of the curves illustrate that construction of a tire has a dramatic effect on the force slip curve. By identifying the tire type from tire identification devices mounted to the tire, the subject system takes tire construction into account in adjusting the ABS thresholding in order to optimized braking performance.

Figure 5:
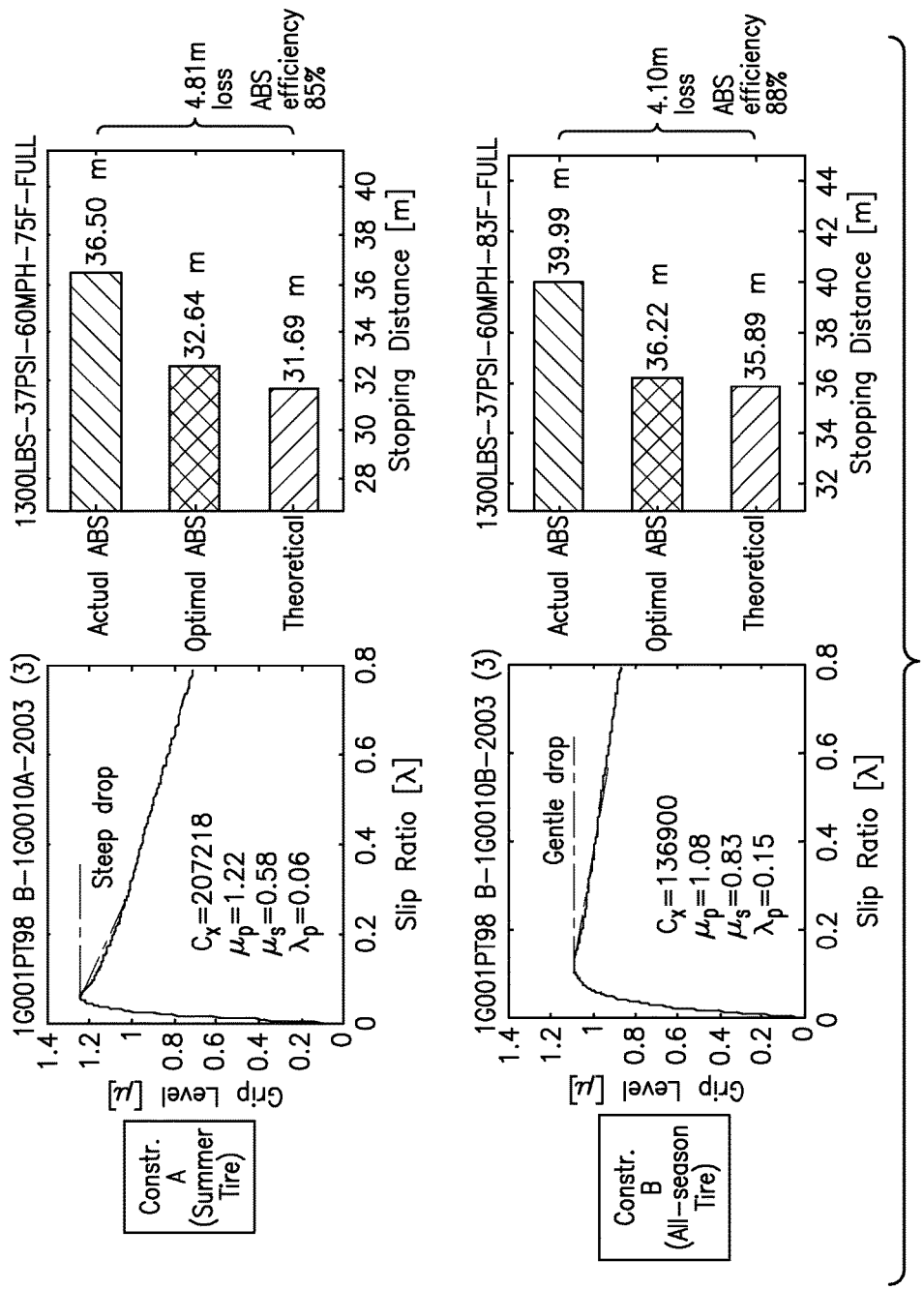
FIG. 5 is a sensitivity study graphs showing grip level vs. slip ratio and stopping distance comparison between a summer and an all-season tire.

FIG. 5 illustrates further sensitivity study results comparing tire construction, summer vs. all-season. The steep drop in the summer tire curve translates into a 4.81 m loss in stopping distance, resulting in an ABS efficiency of 85 percent. The all-season tire, on the other hand, having a more gentle drop, creates a 4.10 m loss in actual to theoretical stopping distance and results in an 88 percent efficiency. ABS dependency on tire construction is thereby validated.

Figure 6:
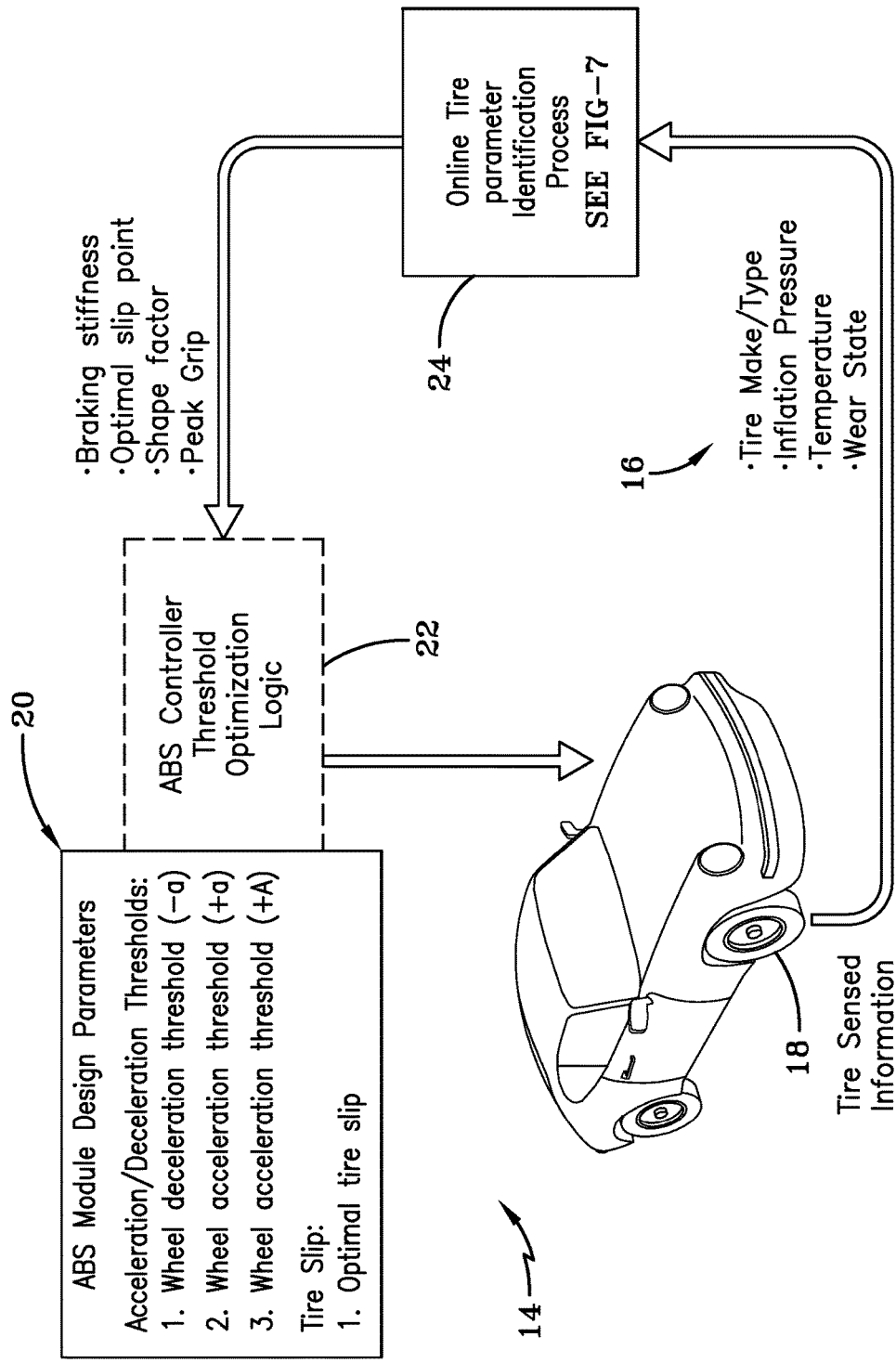
FIG. 6 is a schematic representation of the subject control system utilizing tire sensed information to optimize threshold setting within an ABS system.
Figure 7:
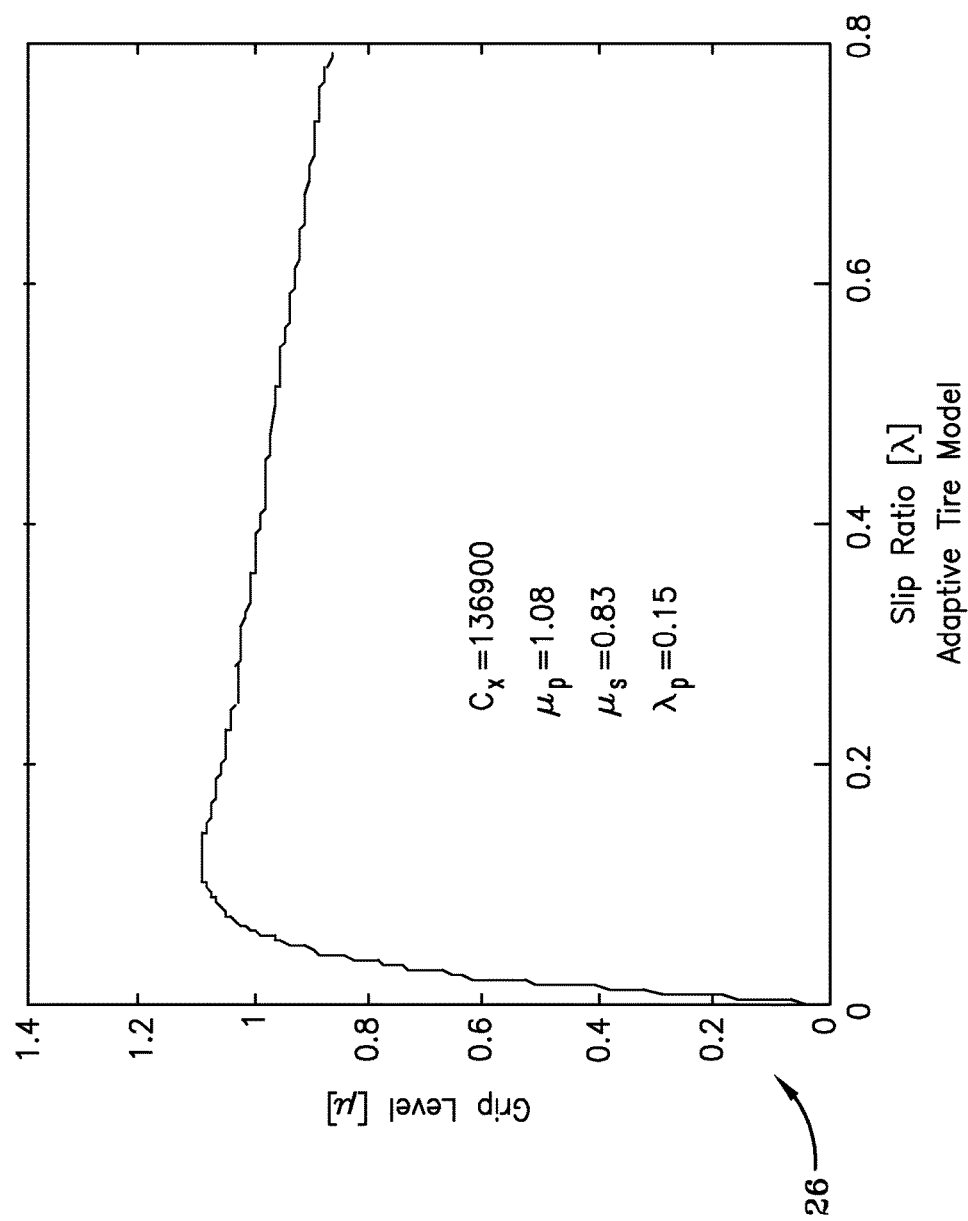
FIG. 7 is a graph showing the online tire parameter identification process.

Referring to FIGS. 6 and 7, the subject control system and method 14 is illustrated schematically. Tire-sensed information 16 is derived from devices affixed to a vehicle tire 18. Such devices include one or more inflation sensors, one or more temperature sensors, a sensor from which tire tread wear may be ascertained and a transponder programmed to provide an identification of the tire as to tire make/type. This collective set of tire-attached devices provide tire-sensed information useful in adjusting the thresholding of the vehicle ABS system through ABS controller threshold optimization logic 22 to an optimized level. ABS module design parameters 20 include multiple acceleration/deceleration thresholds as identified at numeral 20 in addition to tire slip. By determining the actual real-time tire-slip curve for the tire based upon tire-sensed information, an optimal tire slip factor may be used, resulting in an optimization of the ABS thresholding. The system employs an online tire parameter identification process 24 by which tire parameters: braking stiffness, optimal slip point, shape factor and peak grip may be determined. The process 24 represents a linear regression model that uses features extracted from a modified brush model in order to predict the stopping distance, which may further be utilized in a collision mitigation algorithm to adapt its critical distance (warning/braking distance) definitions with changing tire operating conditions, resulting in improved performance (reduced impact speed). The tire-sensed information thus enhances the performances of ABS controllers by optimizing the working thresholds with changing operating conditions of the tires.

The adaptive tire model employed in the online tire parameter identification process 24 results in an on-line, real time slip-curve reflecting the actual condition of the tire 18 during operation. A representative sample of a resultant slip-curve 26 is shown in FIG. 7. Grip level [μ] vs. slip ratio [λ] is graphed, showing a peak slip ratio of 0.0151, a peak grip level of 1.08, and a grip level at peak slip ratio of 0.83. $C_x$ represents braking stiffness.

For current ABS systems, the operating thresholds are experimentally tuned during the vehicle set-up and in order to guarantee the controller robustness, the thresholds are determined as a result of an averaging procedure, taking into account changes in adherence conditions (dry, wet, snow, ice), variations in the vertical load distribution (vehicle loaded or unloaded), etc. The subject system and method enhances the performances of the ABS controller by optimizing the working thresholds.

Figure 8:
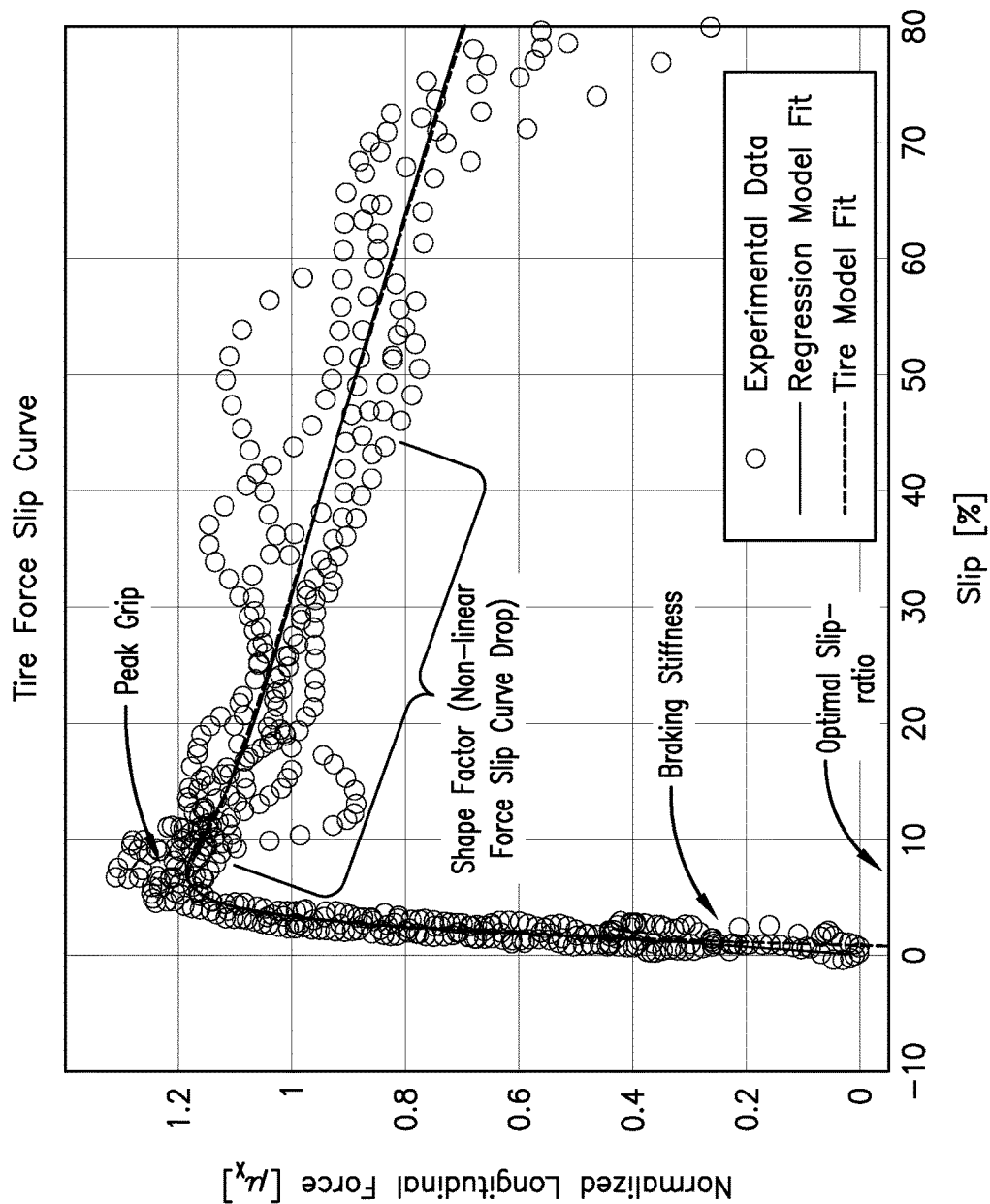
FIG. 8 is a graph showing experimental data, regression model fit and tire model fit in a tire force slip curve.

The importance of tire-sensed information is seen in the graph of FIG. 8, comparing experimental data, regression model fit and tire model fit in a tire force slip curve. Present ABS control strategy prevents wheels from locking up by increasing, decreasing and holding braking pressure ("pressure build up", "pressure release" and "pressure holding" phases). To determine which of these steps to execute, ABS electronic control unit (ECU) compares the peripheral acceleration and the estimated longitudinal slip of each individual wheel with fixed thresholds. Tire-related information is used by the subject system and method as follows:

(A) Peak slip ratio point used to determine the lower and upper slip and acceleration/deceleration threshold, (B) Braking stiffness used to determine the ABS activation point and also tune the first cycle operation, and (C) Shape factor—affects the ABS efficiency (larger the drop implies the tire is less forgiving because of the limited "flat region" of the tire force curve resulting in a loss in the ABS efficiency).

The curve of FIG. 8 identifies the regions providing braking stiffness, peak grip, shape factor and optimal slip ratio information.

Figure 9A:
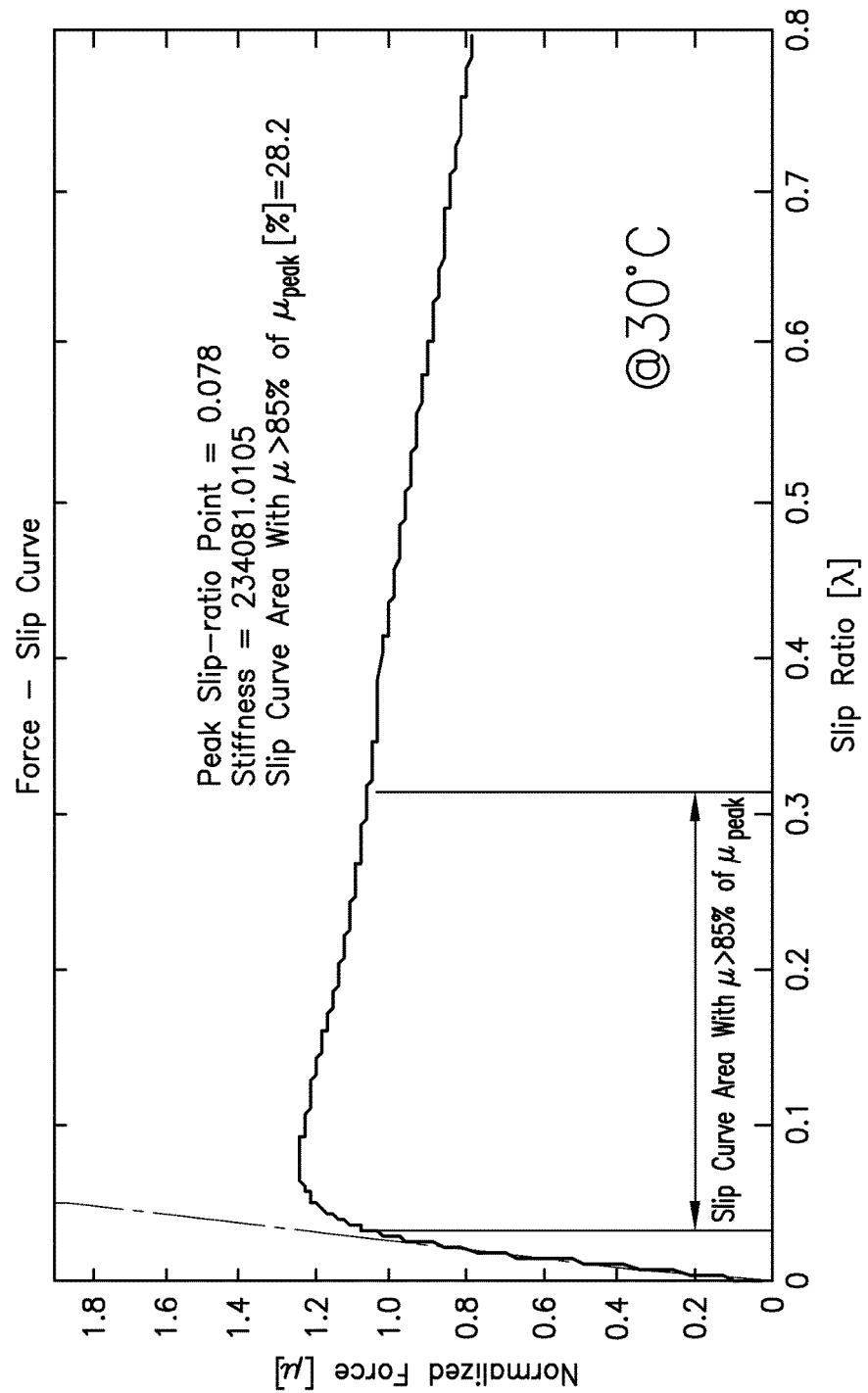
FIG. 9A is a force slip curve graph illustrating tuning ABS thresholds for a normal tire.
Figure 9B:
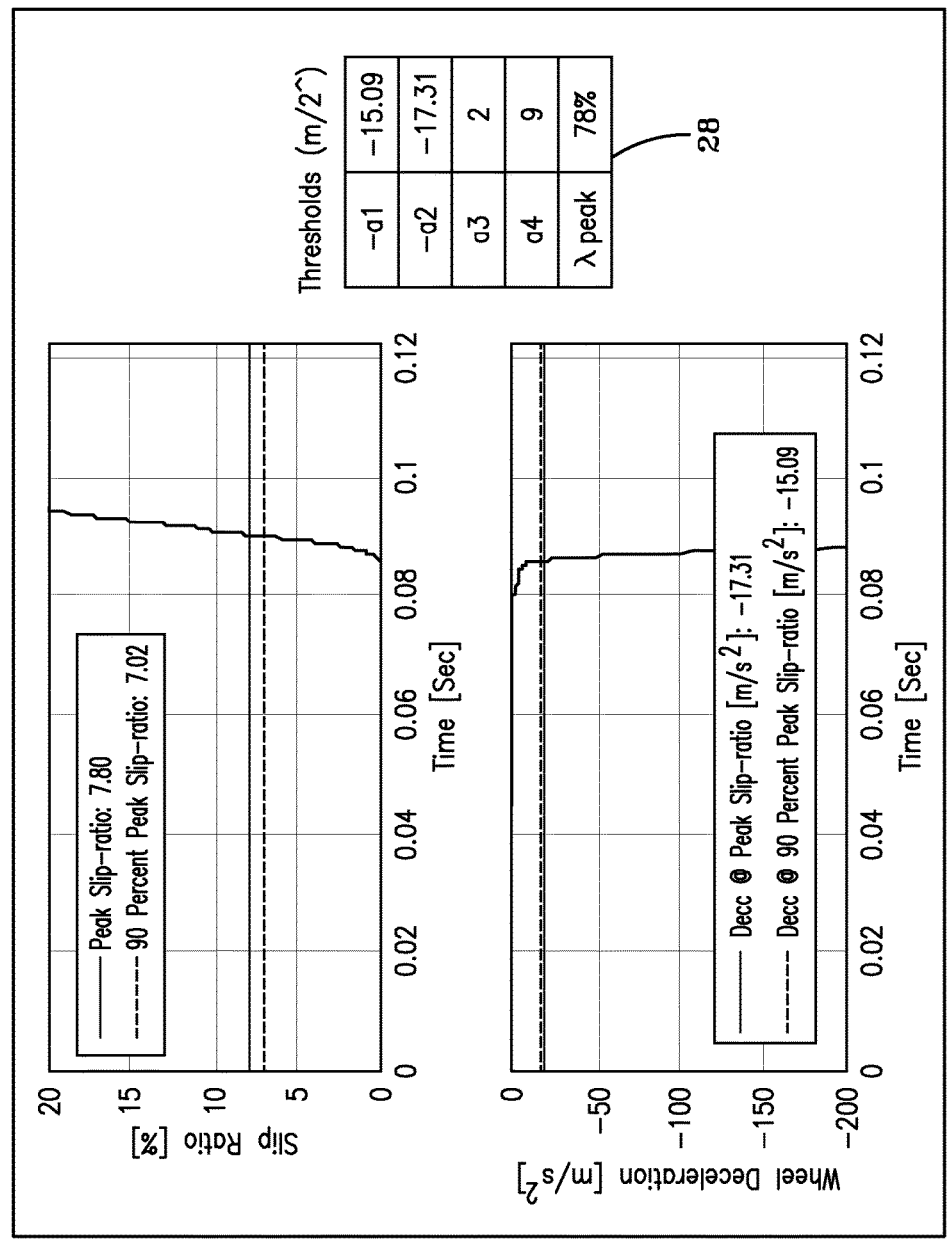
FIG. 9B are slip ratio and wheel deceleration curves illustrating the tuning of ABS thresholds for a normal temperature tire.
Figure 10A:
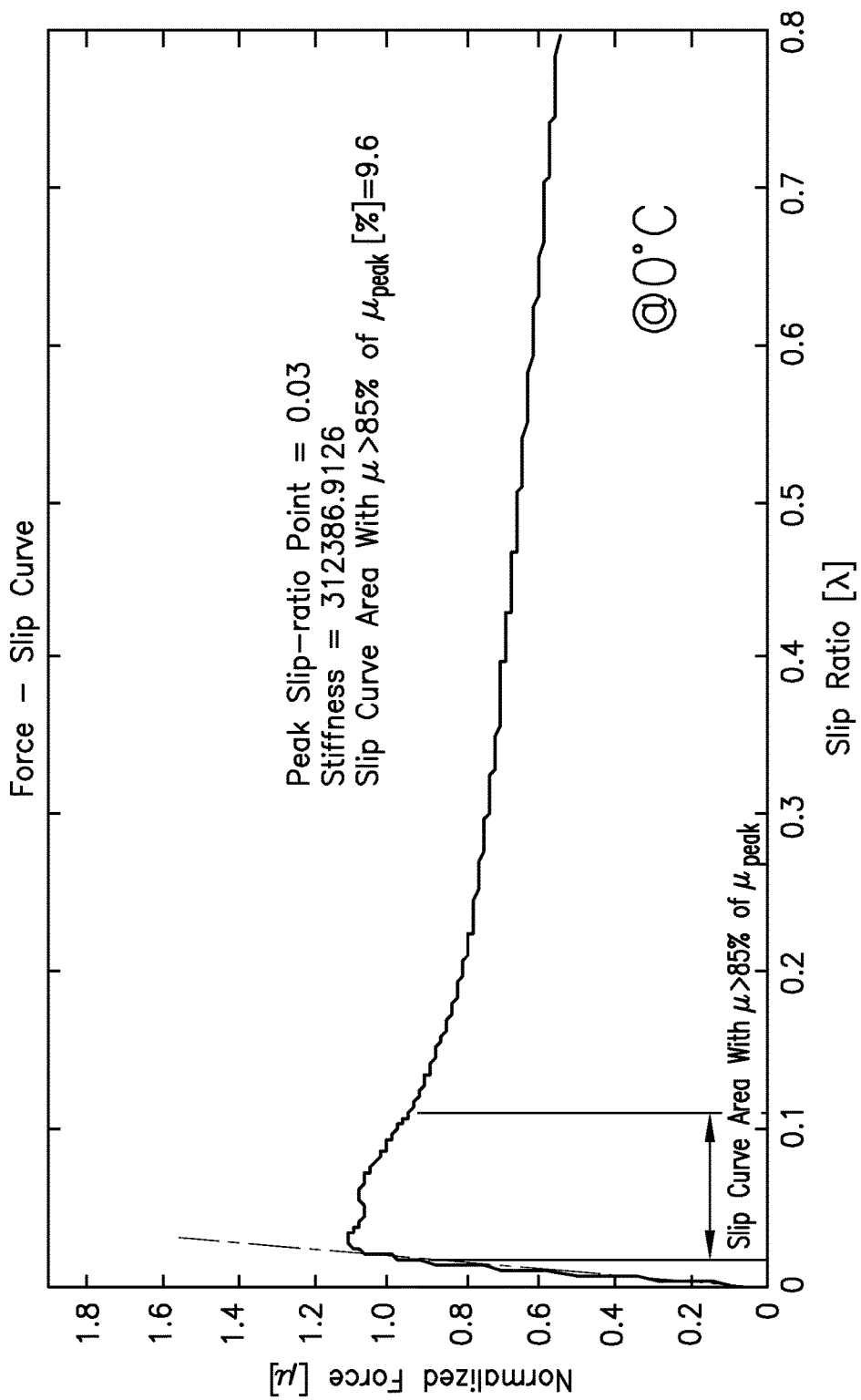
FIG. 10A is a force slip curve graph illustrating the tuning of ABS thresholds for a cold tire.
Figure 10B:
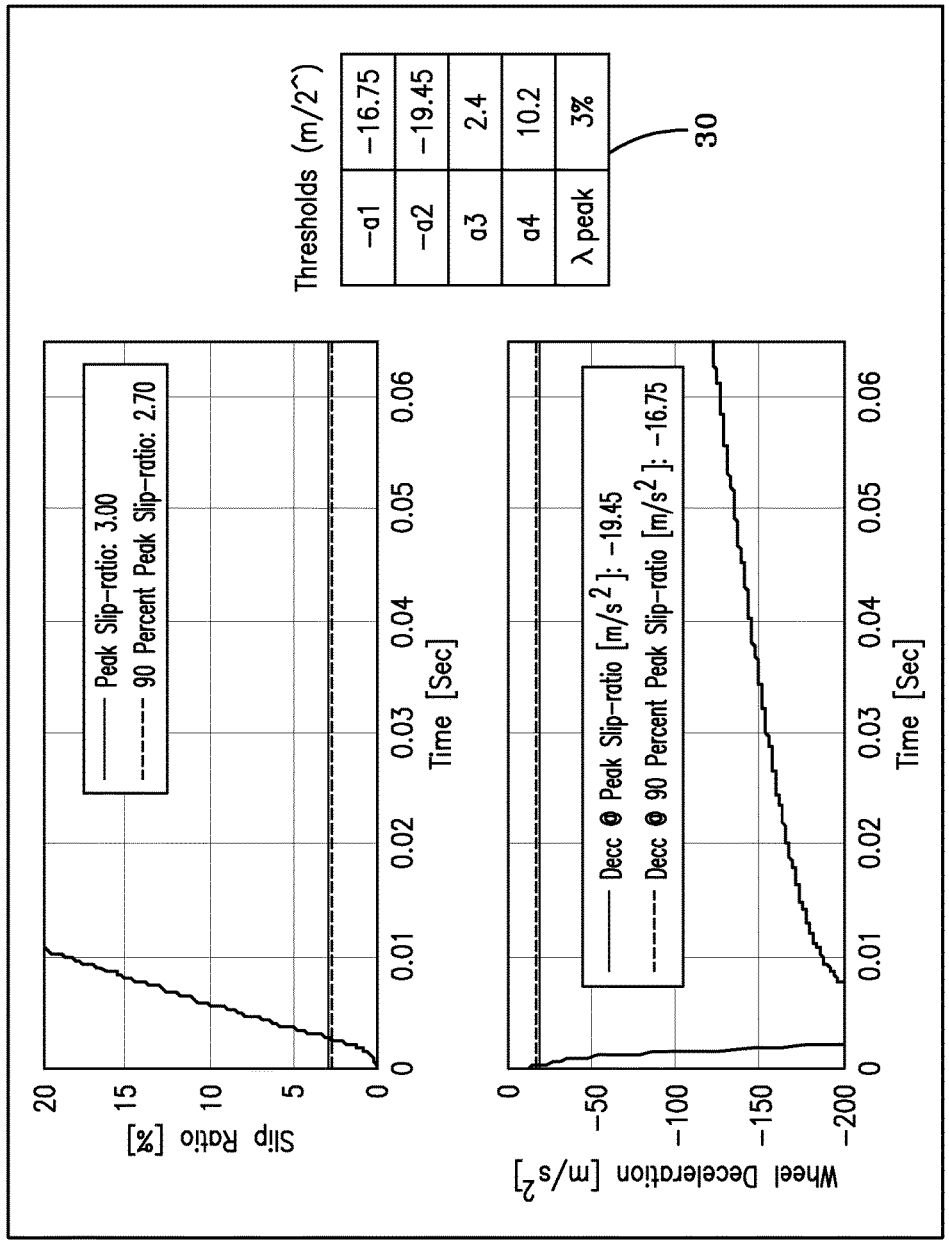
FIG. 10B are slip ratio and wheel deceleration curves illustrating the tuning of ABS thresholds for a cold temperature tire.

FIGS. 9A and 9B are force-slip, slip ratio and wheel deceleration curves presented as example for a normal temperature tire and the ABS threshold tuning derivative therefrom. The conclusions on thresholding are indicated within each graph. From the graphs generated, ABS thresholds are identified and summarized in the table. Similar graphs 10A and 10B are shown as an example of tire curves for a cold tire. The results are summarized in table 30.

Figure 11A:
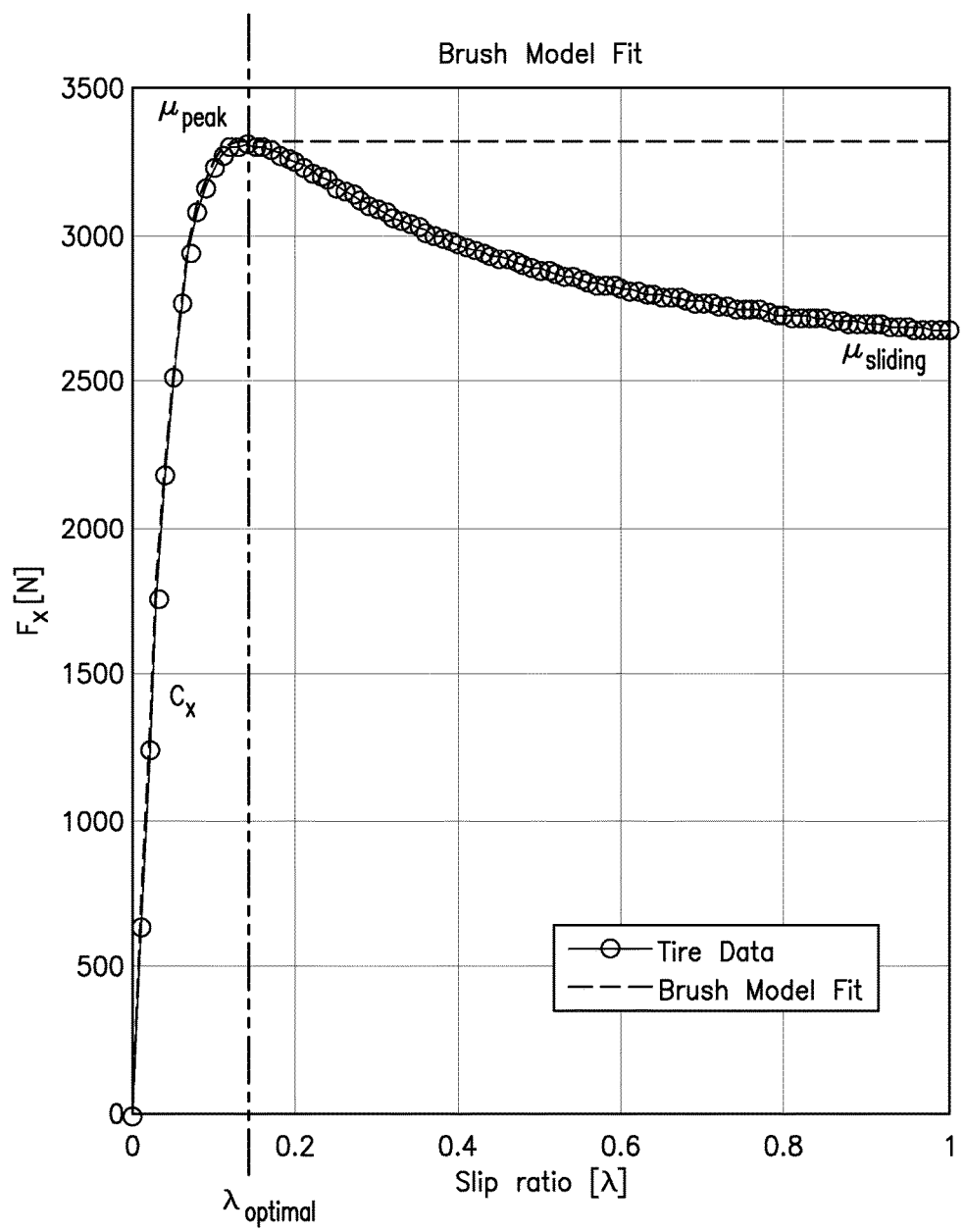
FIG. 11A is a brush model fit graph showing tire data vs. brush model fit comparison.
Figure 11B:
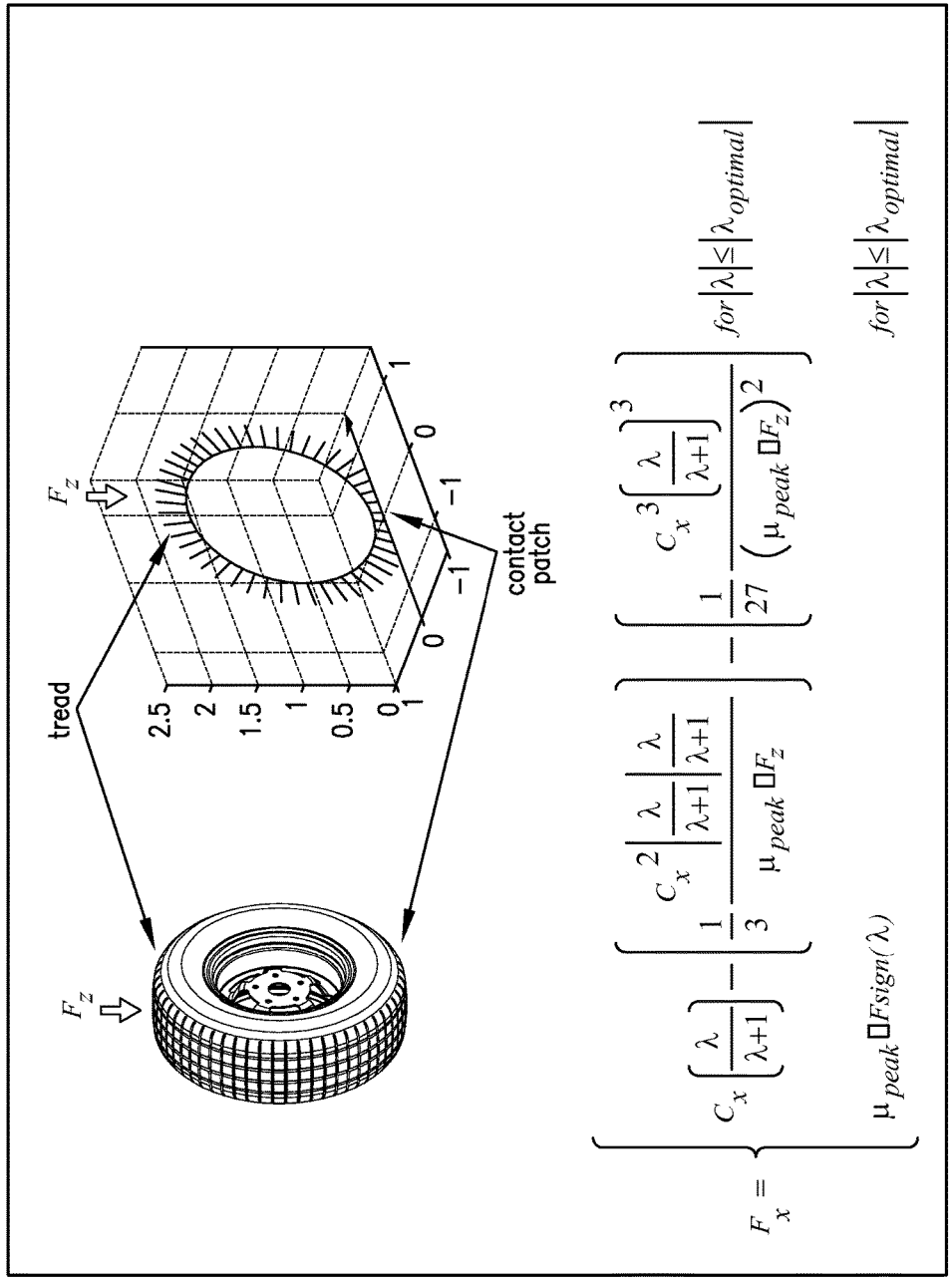
FIG. 11B is a schematic representation and mathematical representation of a tire model suitable for the adaptive model used in the subject control system and method. Also shown is the mathematical representation of the longitudinal force used in the model.

A tire model suitable for use as the adaptive model (24 in FIG. 6) is based upon a conventional tire modeling brush model. The brush model is relatively simple, including two parameters to describe the shape of the force-slip curve, namely, the braking stiffness ($C_x$) and the maximal friction coefficient ($\mu_{peak}$). FIG. 11B shows a schematic for tire 18 using the brush model and the expression solving for longitudinal force $F_x$. FIG. 11A shows in graphic form the fit of the brush model-to-tire data. As will be appreciated, the brush model is relatively inaccurate at large slip ratios, i.e. it cannot characterize the shape factor since the brush model uses the simplifying assumption that static and sliding friction are equal.

Figure 12A:
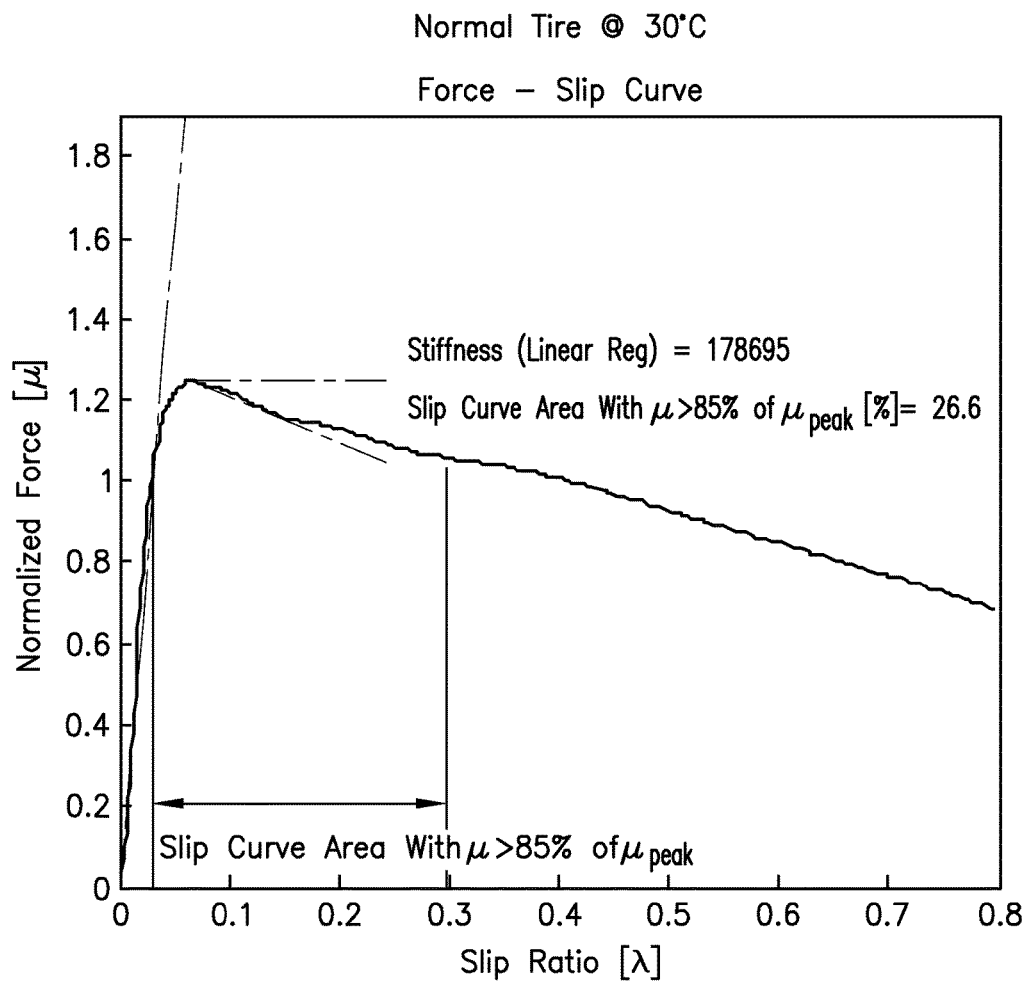
FIG. 12A is a graph shown normalized force vs. slip ratio in a normal tire showing slip curve area with μ greater than 85 percent of peak.
Figure 12B:
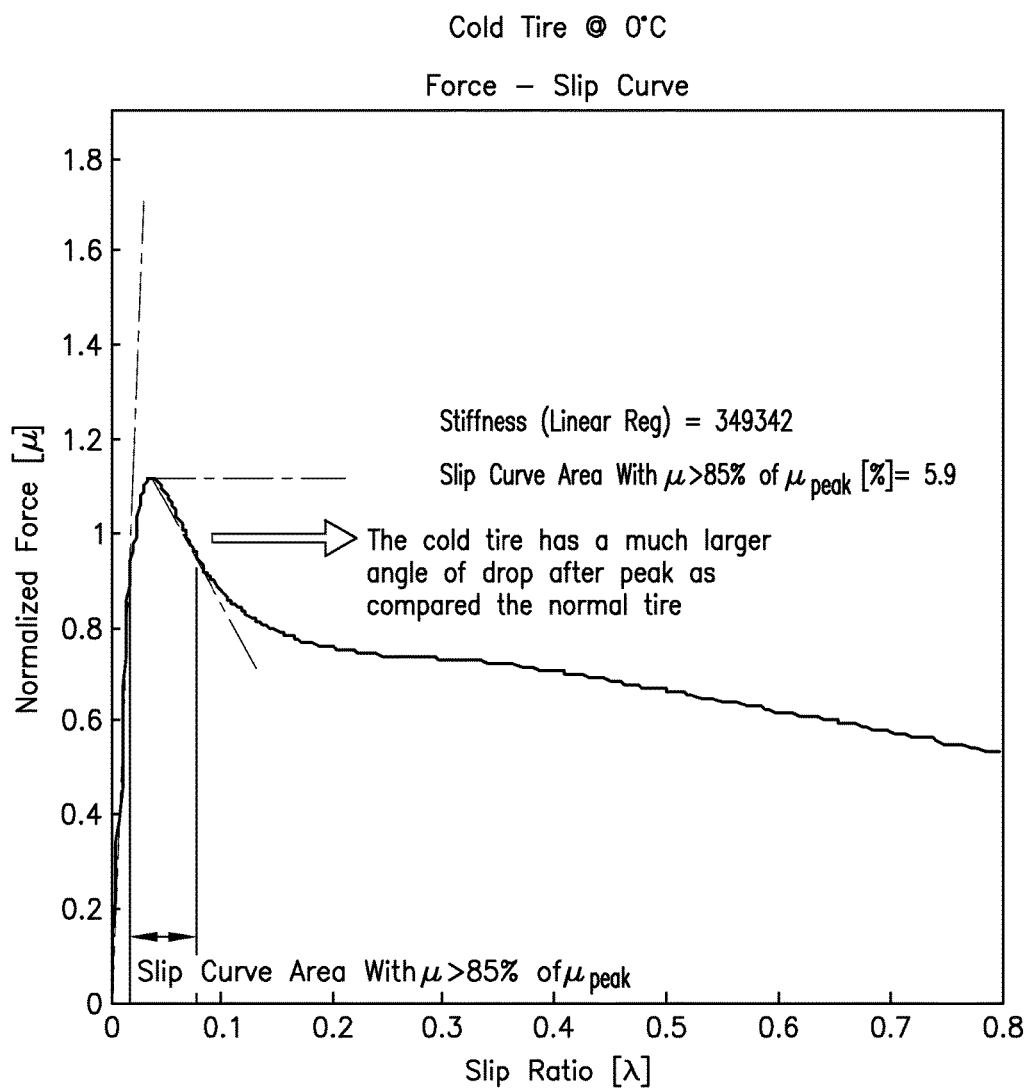
FIG. 12 B is a graph similar to FIG. 12A but for a cold tire.

FIG. 12A shows the importance of characterizing the shape factor (drop in the nonlinear region) for a normal temperature tire. The test speed is 60 mph, load of 1400 pounds and pressure: 34 psi. Stiffness (linear regression) =178695. The slip curve area with μ>85 percent of $\mu_{peak}$ is shown as =26.6. In FIG. 12B the same curve is shown for a cold tire. The value of μ>85 percent of $\mu_{peak}$ for a cold tire is =5.9. The cold tire has a much larger angle of drop after peak as compared to the normal tire.

Figure 13A:
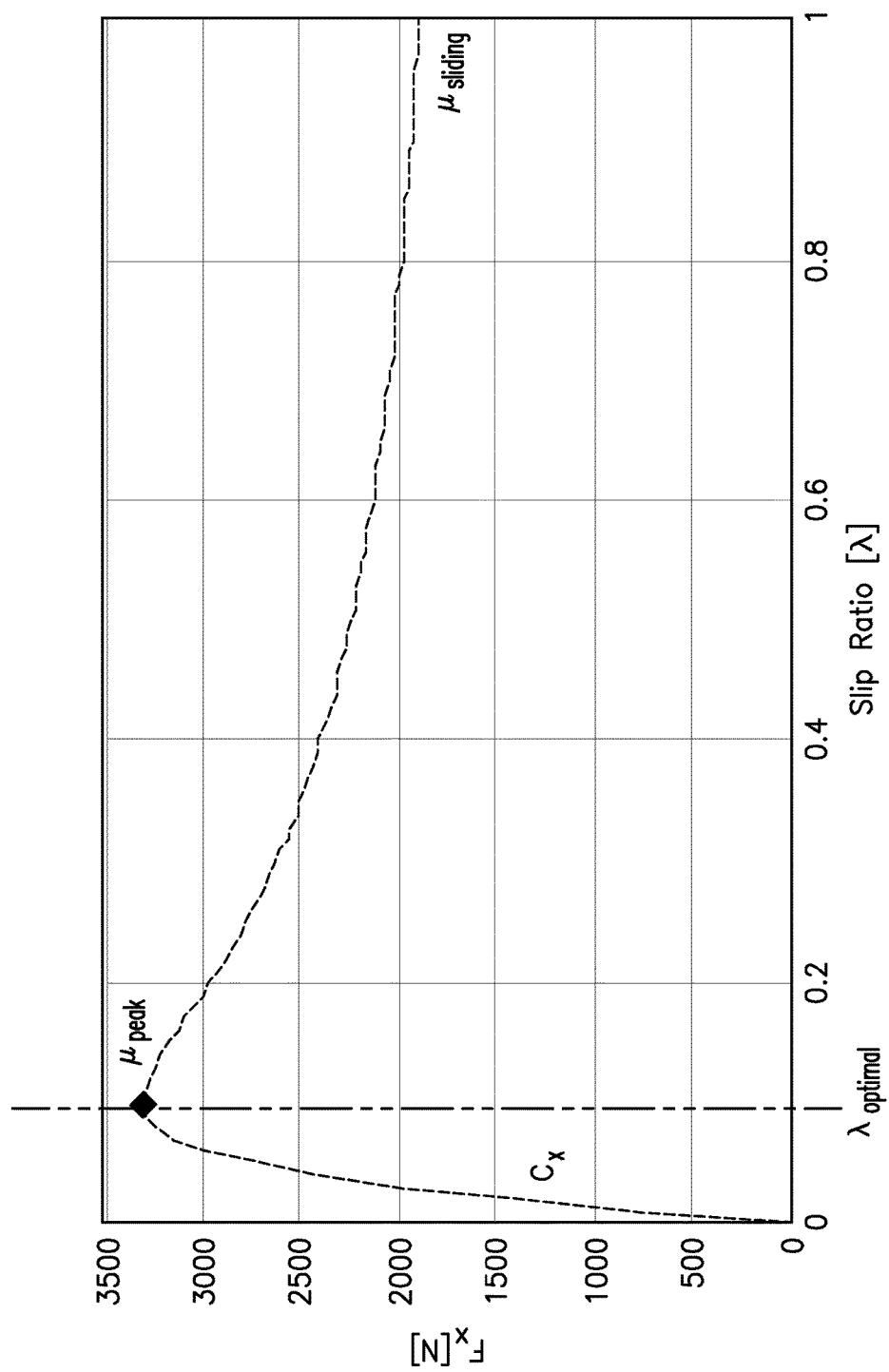
FIG. 13A is a modified brush model force slip curve.
Figure 13B:
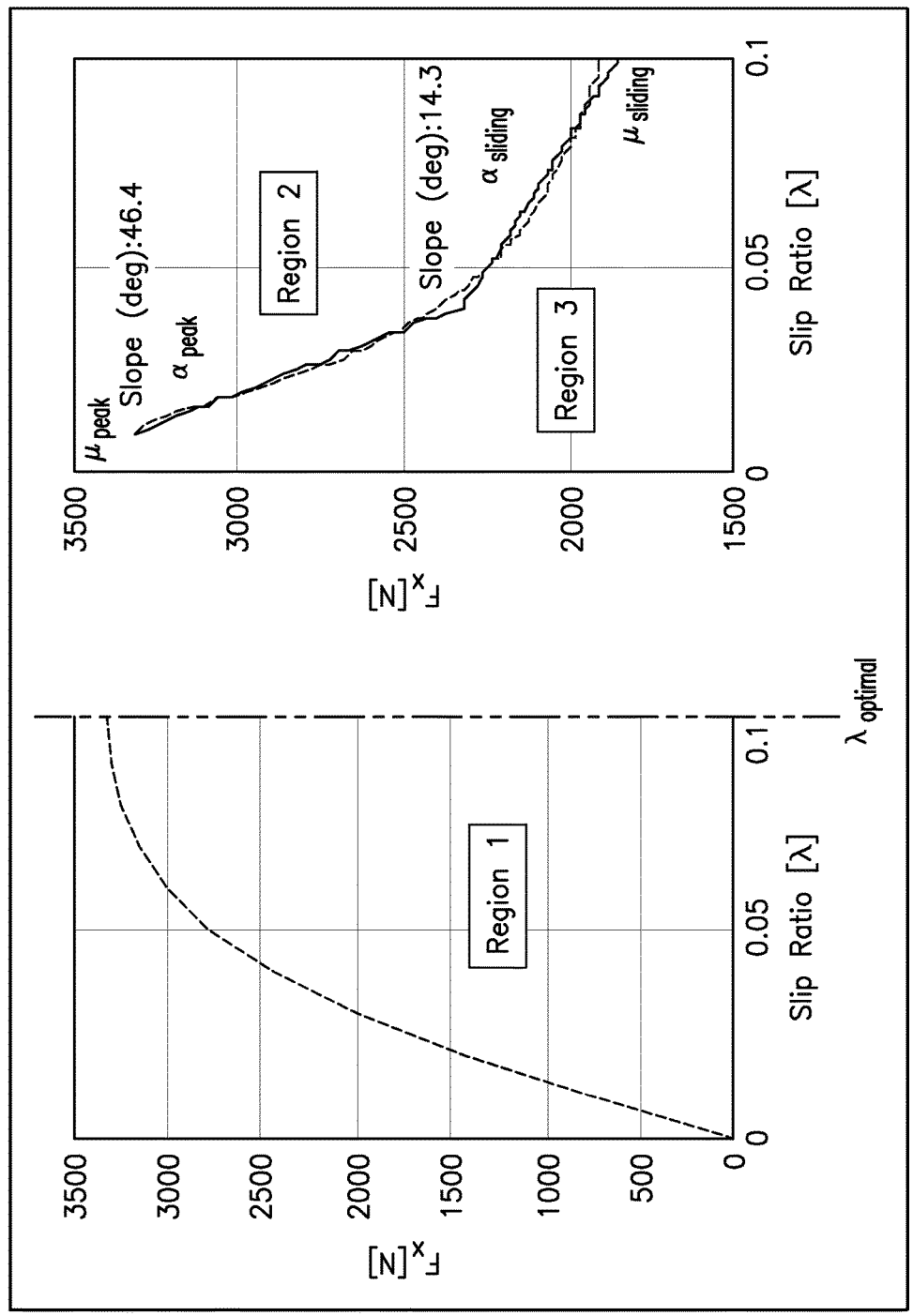
FIG. 13B are enlarged Regions 1, 2 and 3 graphs of the modified brush model force slip curve.

In order to overcome the limitations of the classic brush model, a modified brush model is preferred. In FIG. 13A and enlarged regional representation of FIG. 13A in FIG. 13B, a force slip curve is shown modified by splitting the curve into three separate regions: the region up until the optimal slip point (Region 1) and a region beyond the optimal slip point. The region beyond the optimal slip point is approximated by two line segments (e.g. region 2 and region 3). The regional expressions for longitudinal force are shown below:

$$F_x = \left\{ C_x\left(\frac{\lambda}{\lambda+1}\right) - \left(\frac{1}{3}\frac{C_x^2\left|\frac{\lambda}{\lambda+1}\right|\frac{\lambda}{\lambda+1}}{\mu_{peak} \cdot F_z}\right) - \right. $$
$$\left. \left(\frac{1}{27}\frac{C_x^3\left(\frac{\lambda}{\lambda+1}\right)^3}{(\mu_{peak} \cdot F_z)^2}\right) \text{ for } |\lambda| \le |\lambda_{optimal}| \right. \quad \text{Region 1}$$

$$F_x = \{\mu_{peak}F_z + \alpha_{peak} * (\lambda - \lambda_{optimal}) \text{ for } |\lambda_{optimal}| < |\lambda| \le |0.4| \quad \text{Region 2}$$

$$F_x = \{\mu_{sliding}F_z + \alpha_{sliding} * (\lambda - 1) \text{ for } |0.4| < |\lambda| \le |1| \quad \text{Region 3}$$

Where:
$F_x$: longitudinal force
λ: slip ratio
$C_x$: braking stiffness
$\mu_{peak}$: peak grip level
$\lambda_{optimal}$: slip ratio at point of peak grip $\alpha_{peak}$: shape factor in the peak region
$\alpha_{sliding}$: shape factor in the sliding region Unlike the classical brush model which does not capture the drop/shape factor of the force slip curve, the drop for this modified model is captured by defining two physical terms, namely, the shape factor in the peak region ($\alpha_{peak}$) and the shape factor in the sliding region ($\alpha_{sliding}$). Thus, the modified brush model proposed constitutes a five parameter model with all parameters having a physical meaning. Model parameters: Cx, $\mu_{peak}$, $\mu_{sliding}$, $\alpha_{peak}$, $\alpha_{sliding}$ refer respectively to braking stiffness, peak grip level, sliding grip level, angle of drop after peak and angle of drop in the sliding region.

Figure 14:
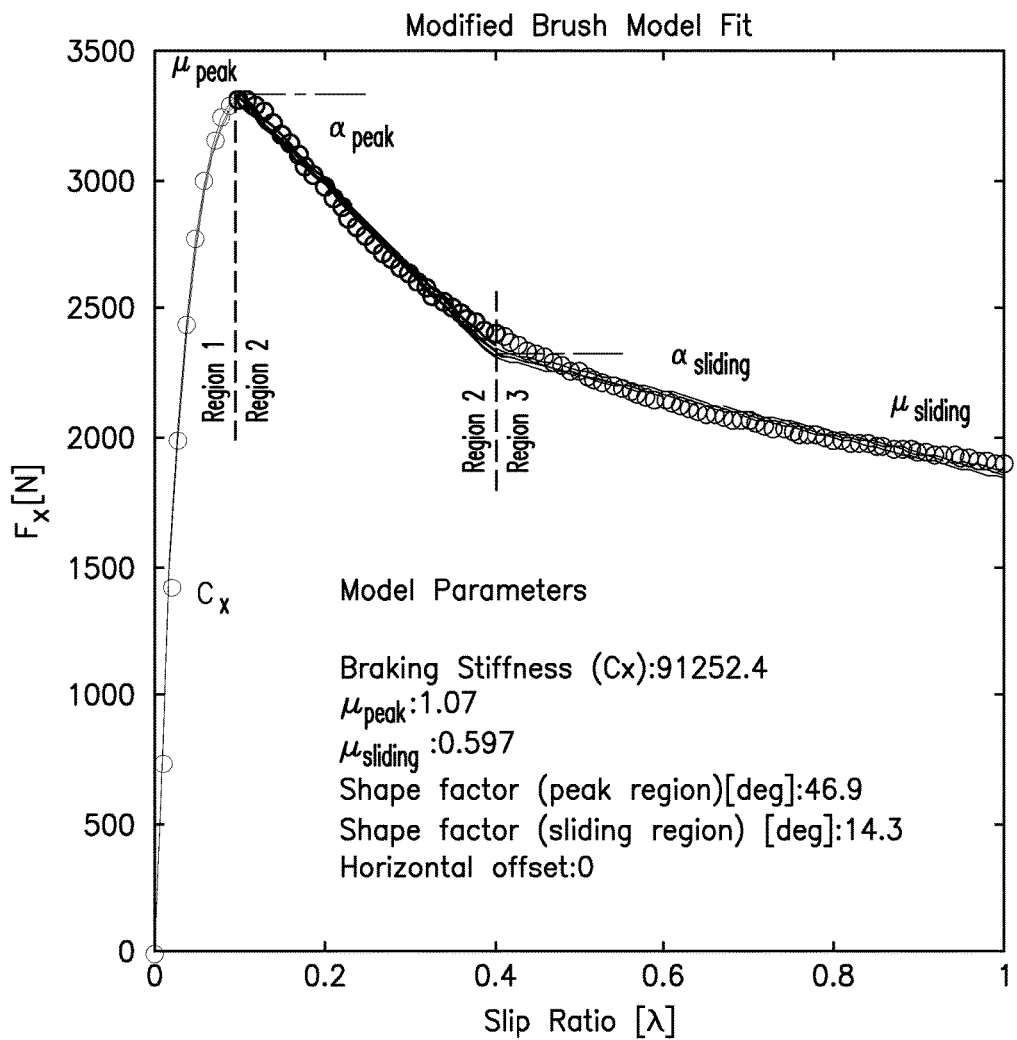
FIG. 14 is a force vs. slip ratio curve showing modified brush model fit.

Referring to FIG. 14, it will be seen that the model parameters accurately fit the test data even in the nonlinear (large slip) region. The regional dissection of the force slip curve in the modified brush model thus is capable of accurately providing the parameters identified above for the purpose of adjusting ABS thresholds.

Figure 15A:
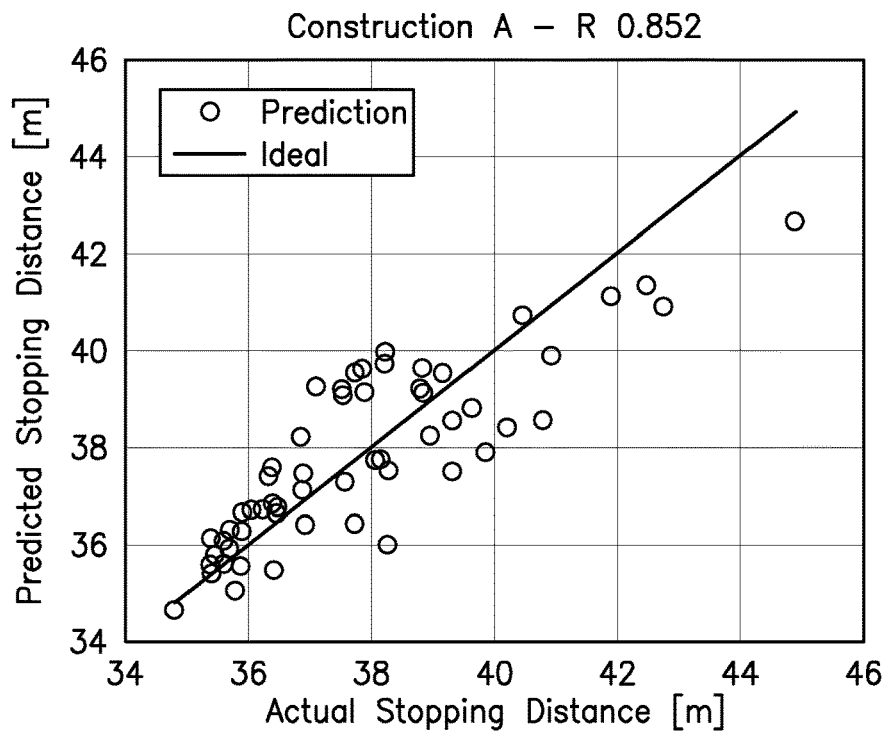
FIG. 15A is a graph of predicted stopping distance vs. actual stopping distance of a tire of construction A.
Figure 15B:
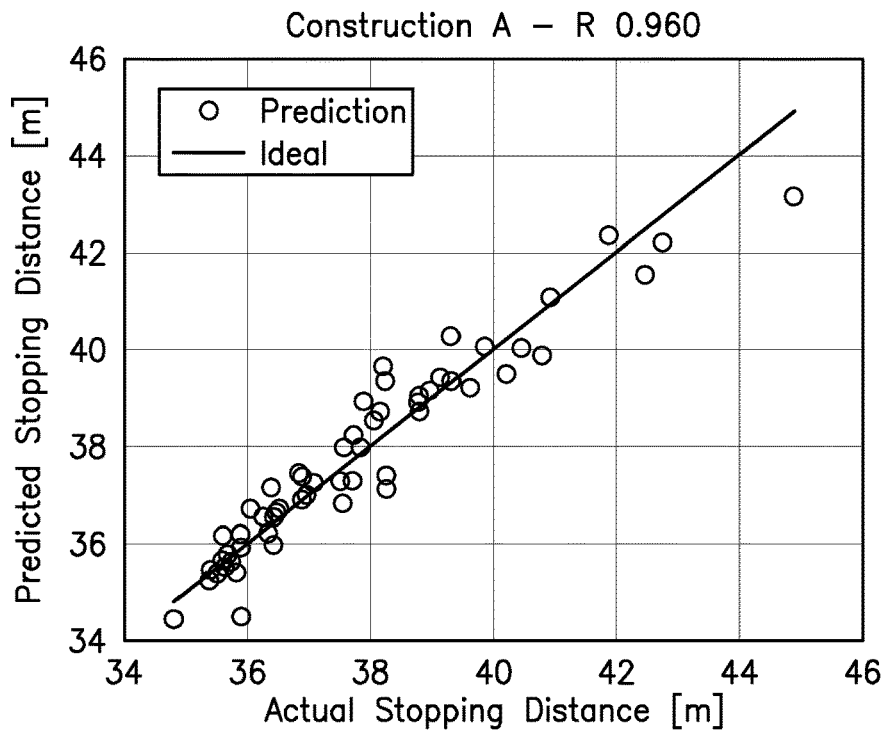
FIG. 15B is a graph of predicted stopping distance vs. actual for a tire of Construction A including a "shape parameter" for improved fit.

In addition to controlling thresholding of an ABS system within a vehicle, the subject system may be used to predict stopping distance of the vehicle in real time and, accordingly, be used to control a collision mitigation brake system (CMBS). The same parameters determined from tire sensed information may be used to predict stopping distance through the use of a prediction model based on the tire state. The correlation of stopping distance to the tire longitudinal force curve features discussed previously is shown in FIGS. 15A and 15B. In FIG. 15A the correlation R to tire braking stiffness and peak grip is =85 percent for a tire of Construction A. In FIG. 15B the correlation to tire braking stiffness, peak grip and shape factor (added parameter) is 96 percent. Thus, the inclusion of the shape factor parameter results in a significantly improved stopping distance prediction to ideal correlation.

Figure 16:
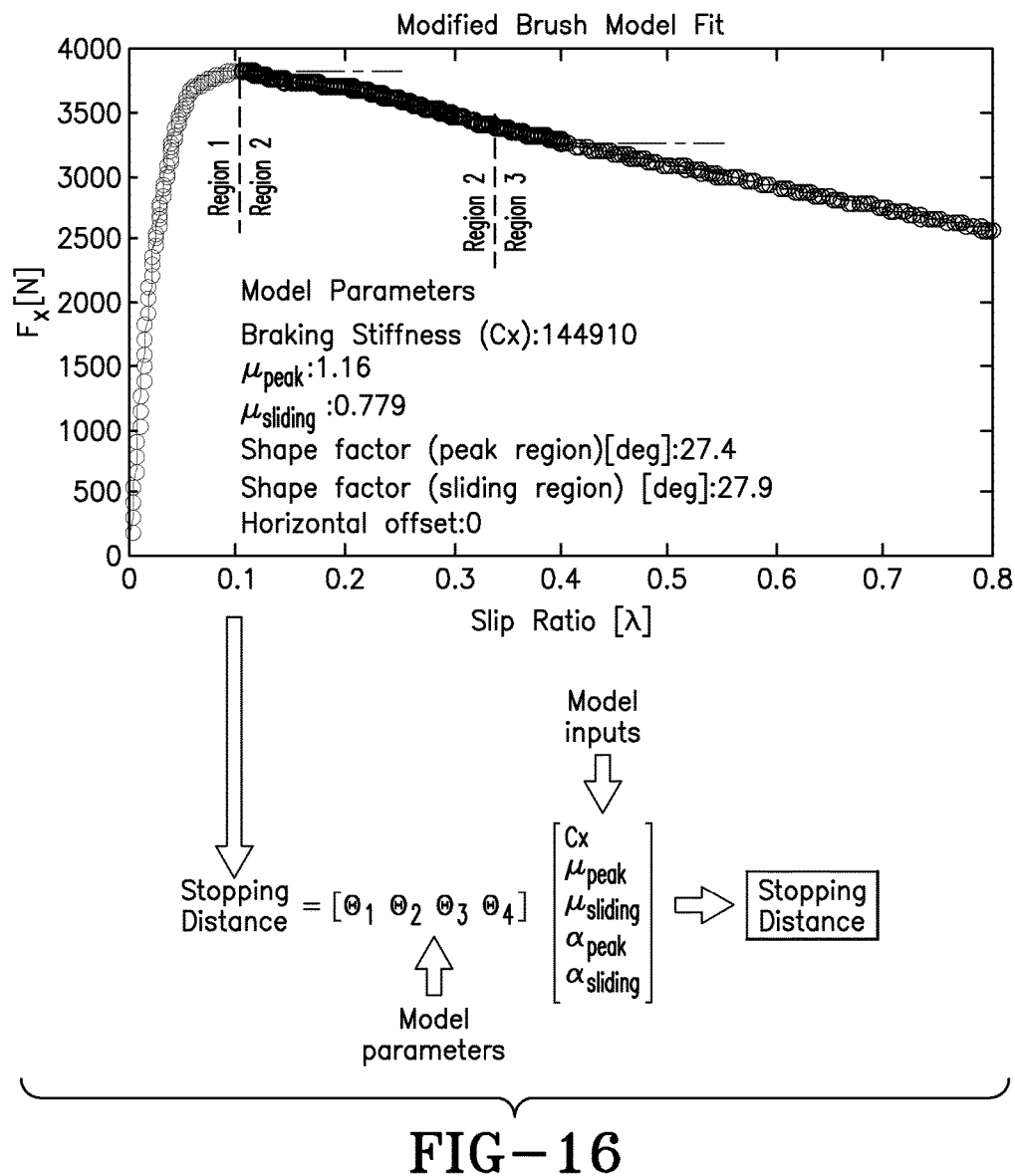
FIG. 16 is a force/slip ratio graph showing modified brush model fit in calculation of stopping distance.
Figure 17A:
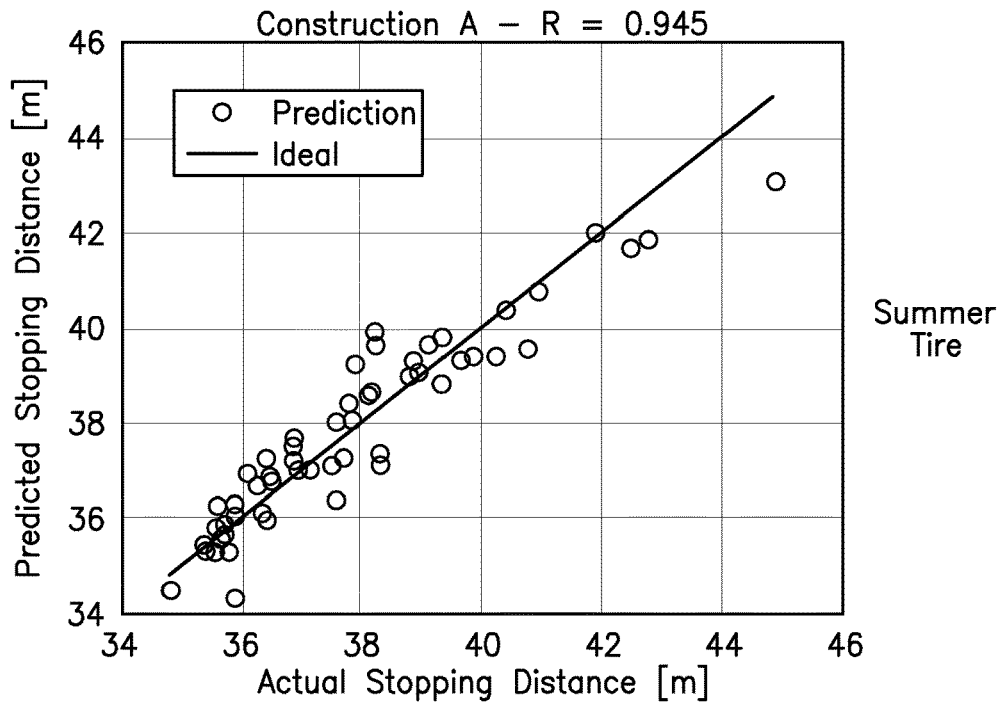
FIG. 17A through 17C are graphs comparing tire construction (summer vs. all-season) for constructions A, B, C, respectively.
Figure 17B:
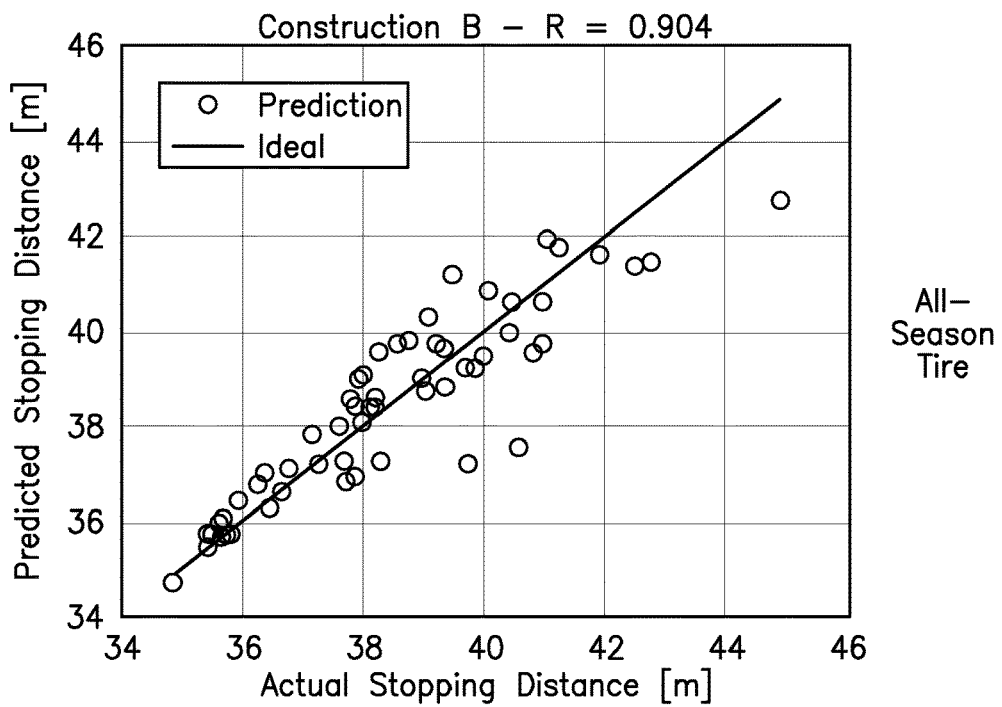
Figure 17C:
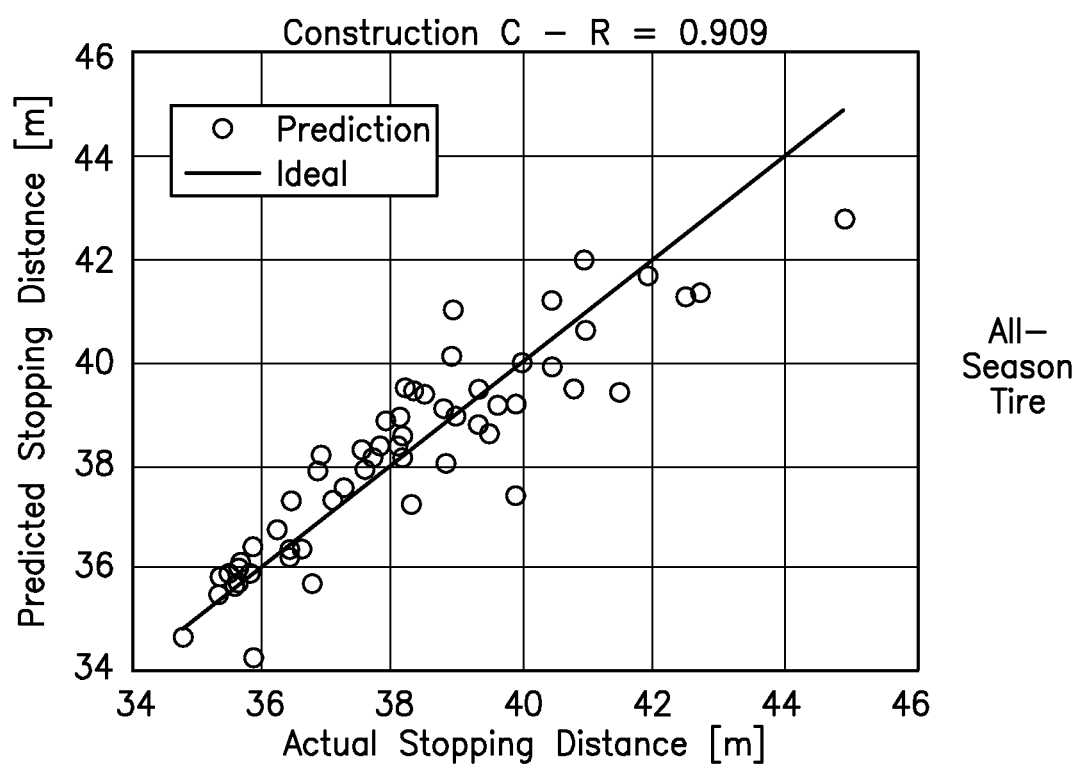

The linear regression model employed uses features extracted from the modified brush model to predict stopping distance as will be seen in FIG. 16. In FIGS. 17A, B, C, the test results of the linear regression model for three different tire constructions are shown. The graphs of predicted stopping distance to actual distance show the model to perform at a high performance level.

Figure 18:
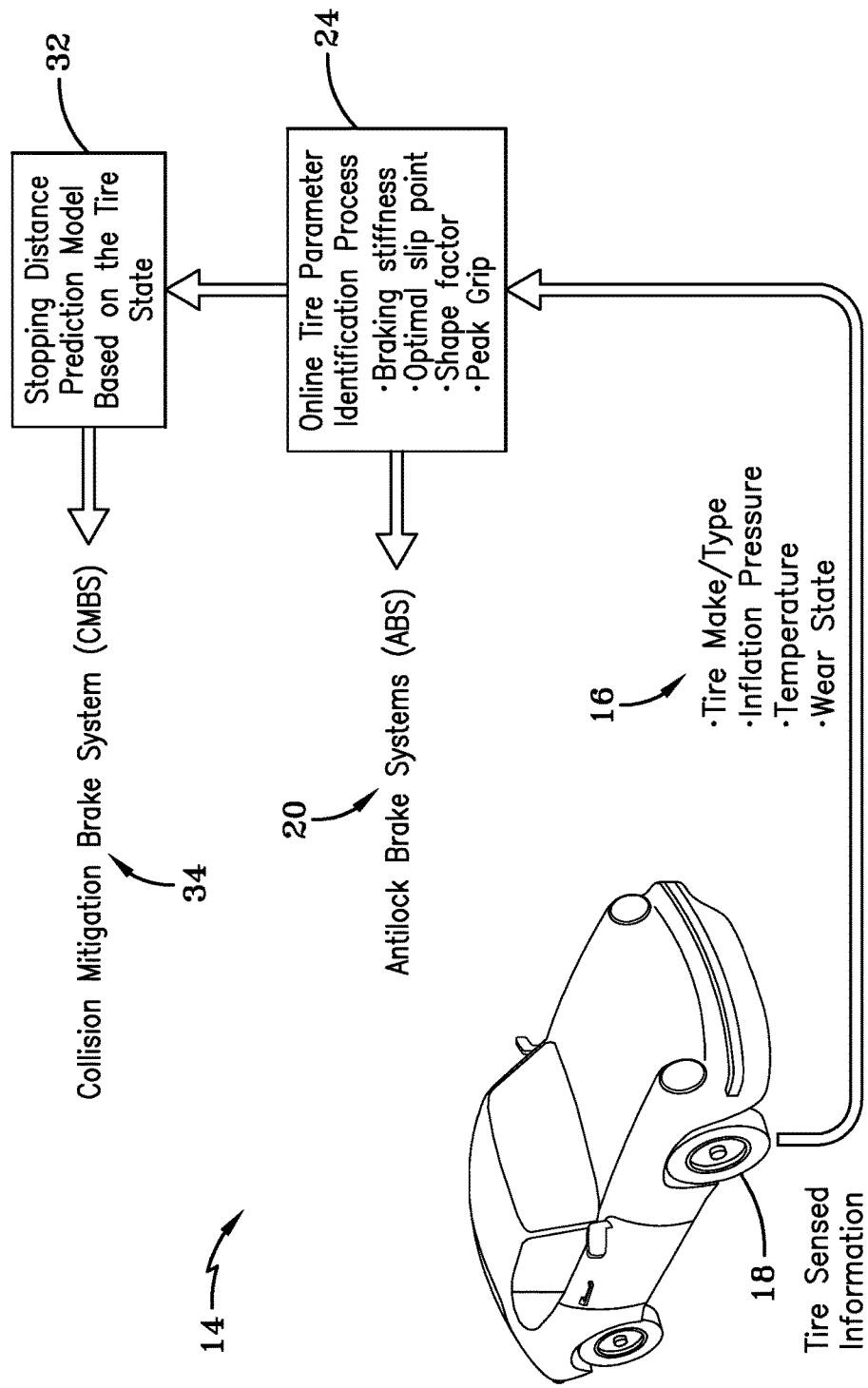
FIG. 18 is a system schematic representation showing use of tire sensed information in modifying ABS and CMBS vehicle control systems.

FIG. 18 shows a schematic for the use of the subject system and method 14 in vehicle control systems. The sensors and ID transponder devices affixed to the tire 18 provide dynamic tire-sensed information in real time. Such information includes tire make/type, inflation pressure, temperature and wear state. Wear state may be determined by affixing wear sensors to the tire tread region or estimated indirectly by analytical modeling. Tread depth may be estimated indirectly pursuant to a tire wear state estimation algorithm, such as that taught and disclosed by co-pending U.S. application Ser. No. 13/917,691 filed Jun. 14, 2013, and hereby incorporated by reference in its entirety herein. The indirect tire wear state estimation algorithm is used to generate tread depth estimation indirectly; that is, without the use of tire mounted tread depth measuring sensors. As such, the difficulty of implementing and maintaining accurate tire-based sensor tread depth measurement is avoided. The indirect tire wear state estimation algorithm utilizes a hub acceleration signal which is accessible via the vehicle CAN Bus from vehicle based sensors. The hub acceleration signal is analyzed and an estimation is made as to the tread depth which, in turn, is reflective of the tire effective radius from which tread depth may be estimated.

The tire sensed information is input into the online tire parameter identification process 24 discussed previously. Upon identification of braking stiffness, optimal slip point, shape factor and peak grip, the thresholds in the vehicle ABS 20 may be adjusted. In addition, the stopping distance prediction model 32 is also based on the tire state parameters identified from tire-sensed information. From stopping distance prediction, the CMBS may be adjusted in real time to provide a more accurate and robust control of vehicle safety.

From the foregoing, it will be appreciated that the subject invention provides a robust and tire-sensor based system and method of optimizing vehicle control systems such as ABS and CMBS. The system utilizes hardware in the form of multiple tire-based sensors mounted to one or all vehicle tires. From the tire based sensors, tire sensed information is obtained in real time and provides certain key tire measurements and identification data such as tire make/type, inflation pressure, temperature and wear state. An adaptive tire model processes the tire sensed information and generates an identification of tire parameters such as braking stiffness, optimal slip point, shape factor and peak grip. These tire parameters are then used to modify the thresholds in the vehicle ABS and/or the stopping distance used in the vehicle CMBS. Predictive knowledge of the ABS stopping distance for a given tire in any state (temperature, pressure, wear state) is beneficial for safety systems, as prior knowledge of the tire's braking capability can be used to improve the robustness of the ABS controller and/or the CMBS system.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle control system comprising:
    a vehicle including at least one supportive vehicle tire, the at least one vehicle tire including a tire cavity, a ground-engaging tread, and a plurality of tire-specific parameters operably affecting at least one of a vehicle anti-lock braking system and a vehicle collision mitigation brake system, the plurality of tire-specific parameters including tire braking stiffness, tire optimal slip point, tire shape factor and tire peak grip;
    a plurality of tire-based sensors mounted to the at least one vehicle tire operably sensing tire-specific information, the tire-specific information including tire type, tire inflation pressure and tire temperature;
    an adaptive tire model processor operably receiving as inputs the tire-specific information, wherein the adaptive tire model processes the inputs through an adaptive model to substantially continuously generate revisions in real-time to the plurality of tire-specific parameters; and
    the at least one of the vehicle anti-lock braking system and a vehicle collision mitigation brake system operably modifying at least one control system parameter in response to the revisions to the plurality of tire-specific parameters.

2. The vehicle control system of claim 1, wherein the tire-specific information further comprises tire make and tire tread wear state.

3. The vehicle control system of claim 2, wherein the at least one control system parameter is from the group:

acceleration and deceleration thresholds for the vehicle anti-lock brake system and vehicle stopping distance.

4. The method of claim 1, wherein the adaptive tire model processor includes a modified brush model.

\* \* \* \* \*